(12) United States Patent
Hruska et al.

(10) Patent No.: US 9,612,940 B1
(45) Date of Patent: Apr. 4, 2017

(54) COMBINATION AND REUSE OF PARAMETERS IN AN AUTOMATED TEST ENVIRONMENT

(71) Applicant: The MathWorks, Inc., Natick, MA (US)

(72) Inventors: David Hruska, Chestnut Hill, MA (US); Andrew T. Campbell, Medway, MA (US); David A. Foti, Holliston, MA (US); David M. Saxe, Stow, MA (US)

(73) Assignee: The MathWorks, Inc., Natick, MA (US)

( * ) Notice: Subject to any disclaimer, the term of this patent is extended or adjusted under 35 U.S.C. 154(b) by 4 days.

(21) Appl. No.: 13/907,020

(22) Filed: May 31, 2013

(51) Int. Cl.
G06F 11/00 (2006.01)
G06F 11/36 (2006.01)

(52) U.S. Cl.
CPC .............................. *G06F 11/3664* (2013.01)

(58) Field of Classification Search
CPC ............. G06F 11/3688; G06F 11/3676; G06F 11/3684; G06F 11/3636; G06F 11/3664
USPC ....................................................... 714/38.1
See application file for complete search history.

(56) References Cited

U.S. PATENT DOCUMENTS

| 6,530,046 | B1* | 3/2003 | Hasegawa et al. | 714/719 |
|---|---|---|---|---|
| 7,526,498 | B2* | 4/2009 | Dubovsky | G06F 11/3664 |
| 8,276,123 | B1* | 9/2012 | Deng et al. | 717/125 |
| 2003/0097650 | A1* | 5/2003 | Bahrs | G06F 11/3688 717/124 |
| 2004/0010735 | A1* | 1/2004 | Paternostro | G06F 11/3684 714/38.14 |
| 2004/0044993 | A1* | 3/2004 | Muller | G06F 11/3684 717/124 |
| 2007/0006046 | A1* | 1/2007 | Overman et al. | 714/38 |
| 2007/0234121 | A1* | 10/2007 | He | G06F 11/3684 714/33 |
| 2008/0082968 | A1* | 4/2008 | Chang et al. | 717/128 |

OTHER PUBLICATIONS

"xUnit" from *Wikipedia, the free encyclopedia*, www.en.wikipedia.org/wiki/XUnit, May 1, 2013 (Print Date), 3 pages.
"JUnit", http://junit.org, Version 4.12, Last Published: Dec. 4, 2014, Apr. 30, 2015 (Print Date), 1 page.
"Nunit" http://www.nunit.org, Apr. 30, 2015 (Print Date), 2 pages.
"NUnit-TestCaseAttribute (NUnit 2.5)", from http://nunit.org/index.php?p=testCase&r=2.5, Nov. 25, 2015 (Print Date), © 2002-2015 NUnit.org, 2 pages.

(Continued)

*Primary Examiner* — Yair Leibovich
(74) *Attorney, Agent, or Firm* — Harrity & Harrity, LLP

(57) ABSTRACT

A device receives test methods that include input arguments that match parameters. The test methods are used to test one or more portions of dynamically-type programming code, and the parameters define conditions for the test methods. The device receives one or more values for each of the parameters, and applies the parameters and the one or more values to different ones of the test methods. The device executes the different ones of the test methods, with the applied parameters and the applied one or more values, to generate results, and outputs or stores the results.

16 Claims, 28 Drawing Sheets

(56) References Cited

OTHER PUBLICATIONS

"NUnit-TestCaseSourceAttribute (NUnit 2.5)", from http//nunit.org/index.php?p=testCaseSource&r=2.5, Nov. 25, 2015 (Print Date), © 2002-2015 NUnit.org, 3 pages.
"GitHub-junit-team/junit- Paremeterized tests", from https://github.com/junit-team/junit/wiki/Parameterized-tests, Nov. 25, 2015 (Print Date), © 2015 GitHut, Inc., 3 pages.

\* cited by examiner

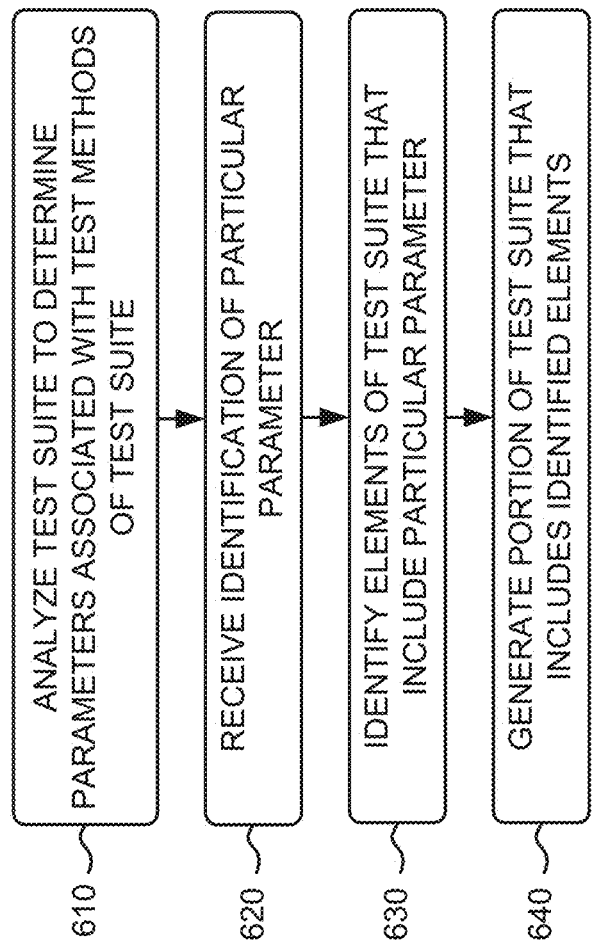

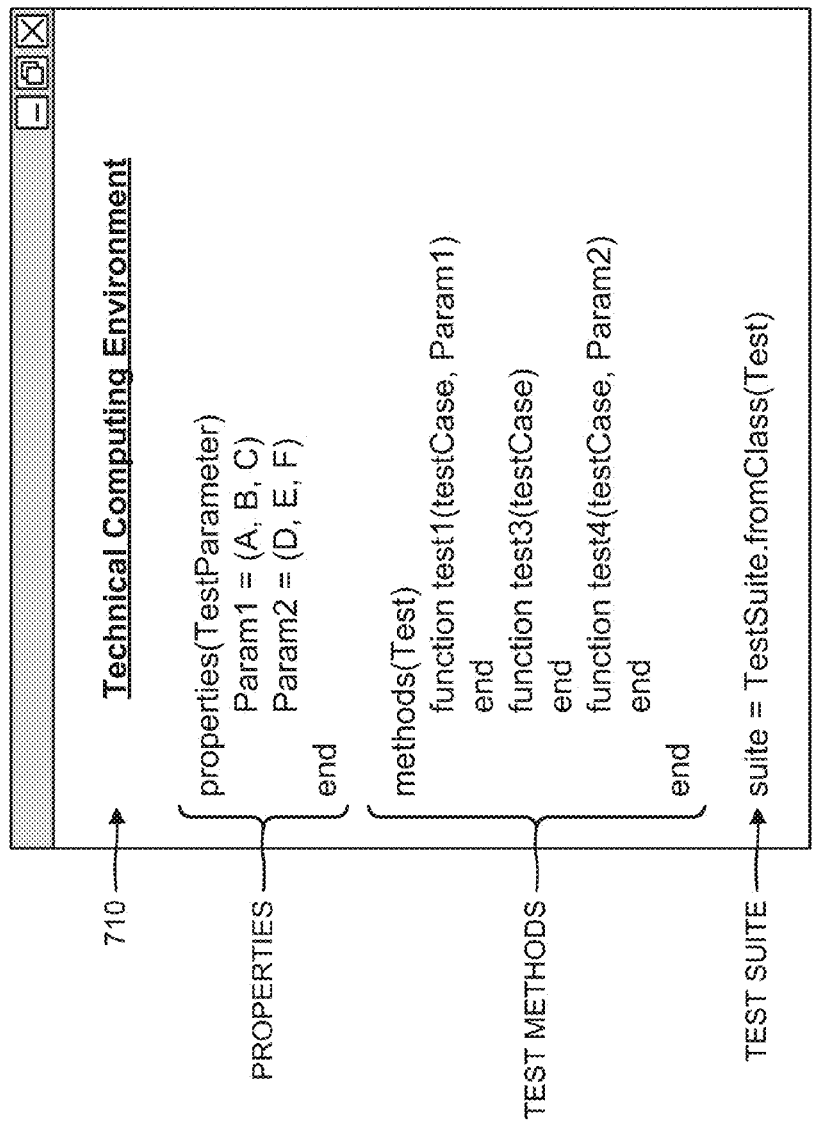

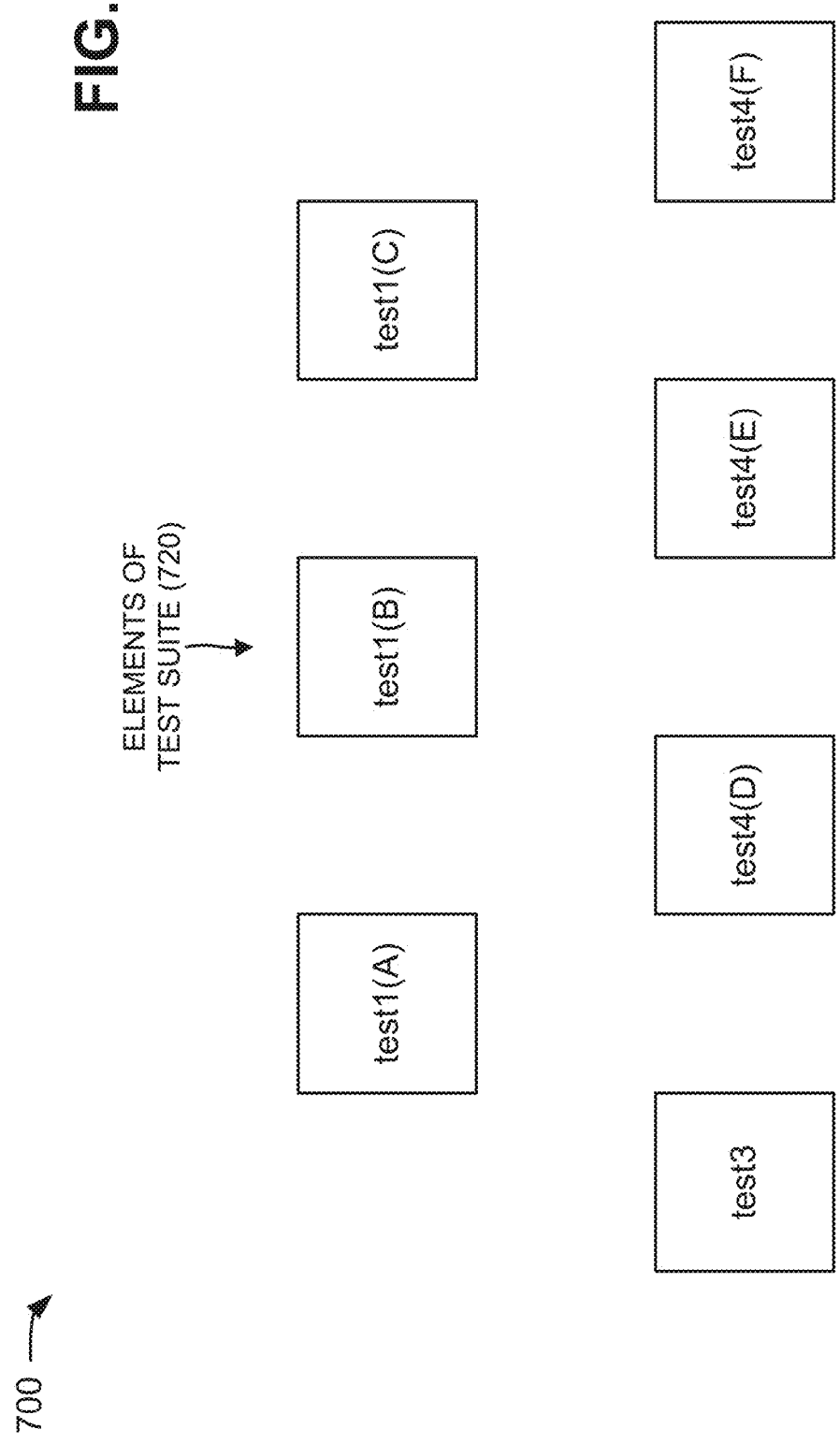

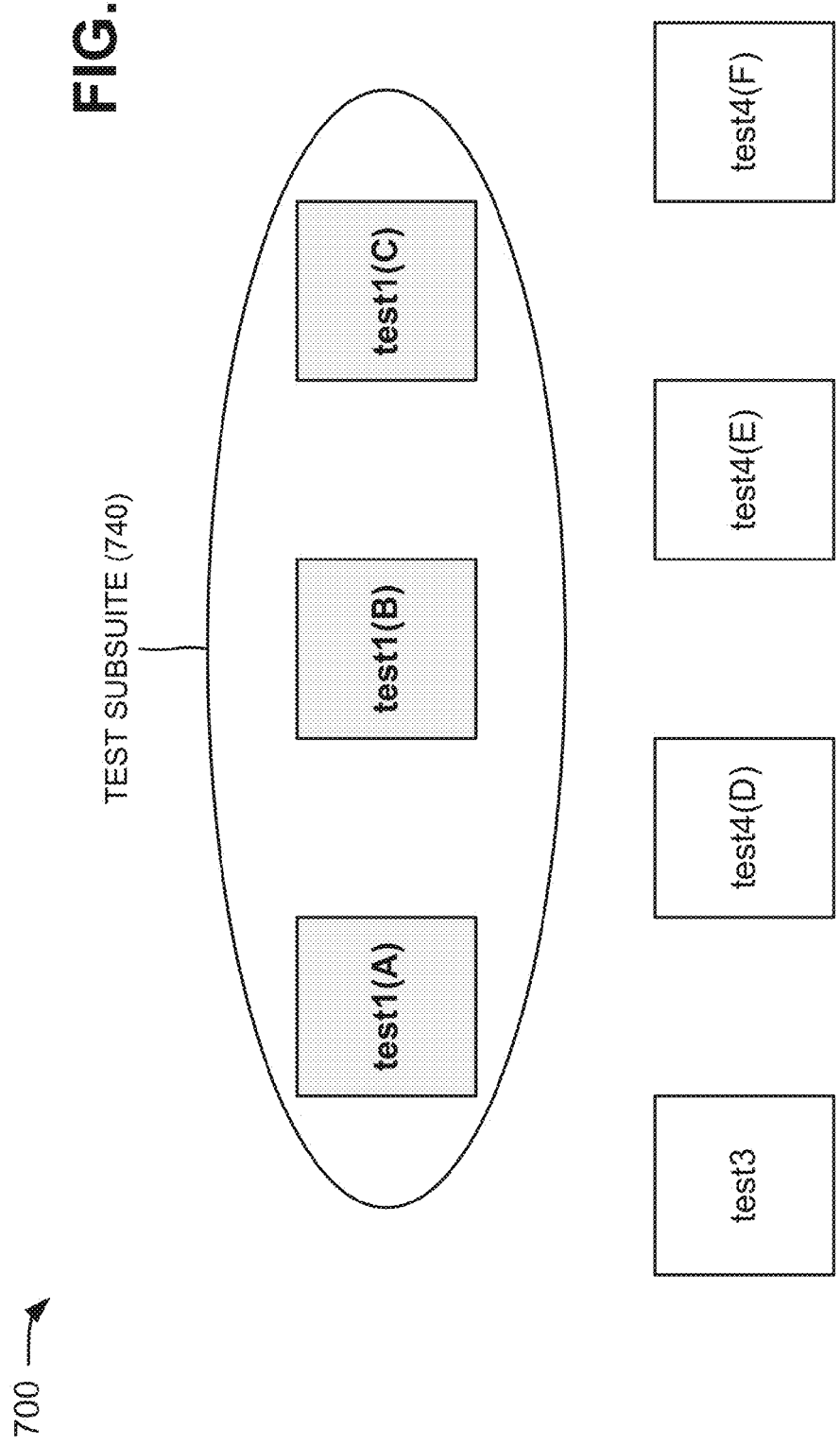

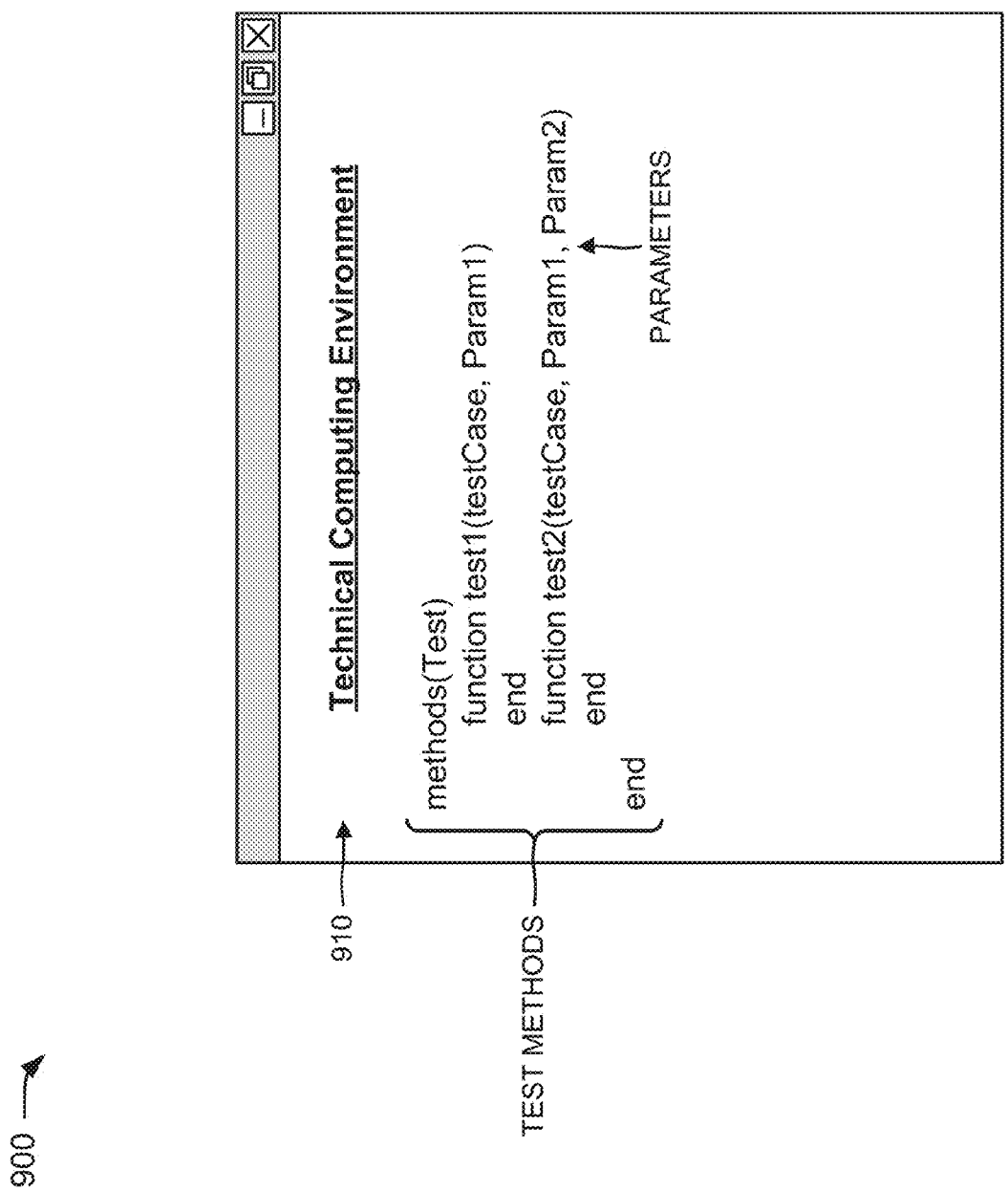

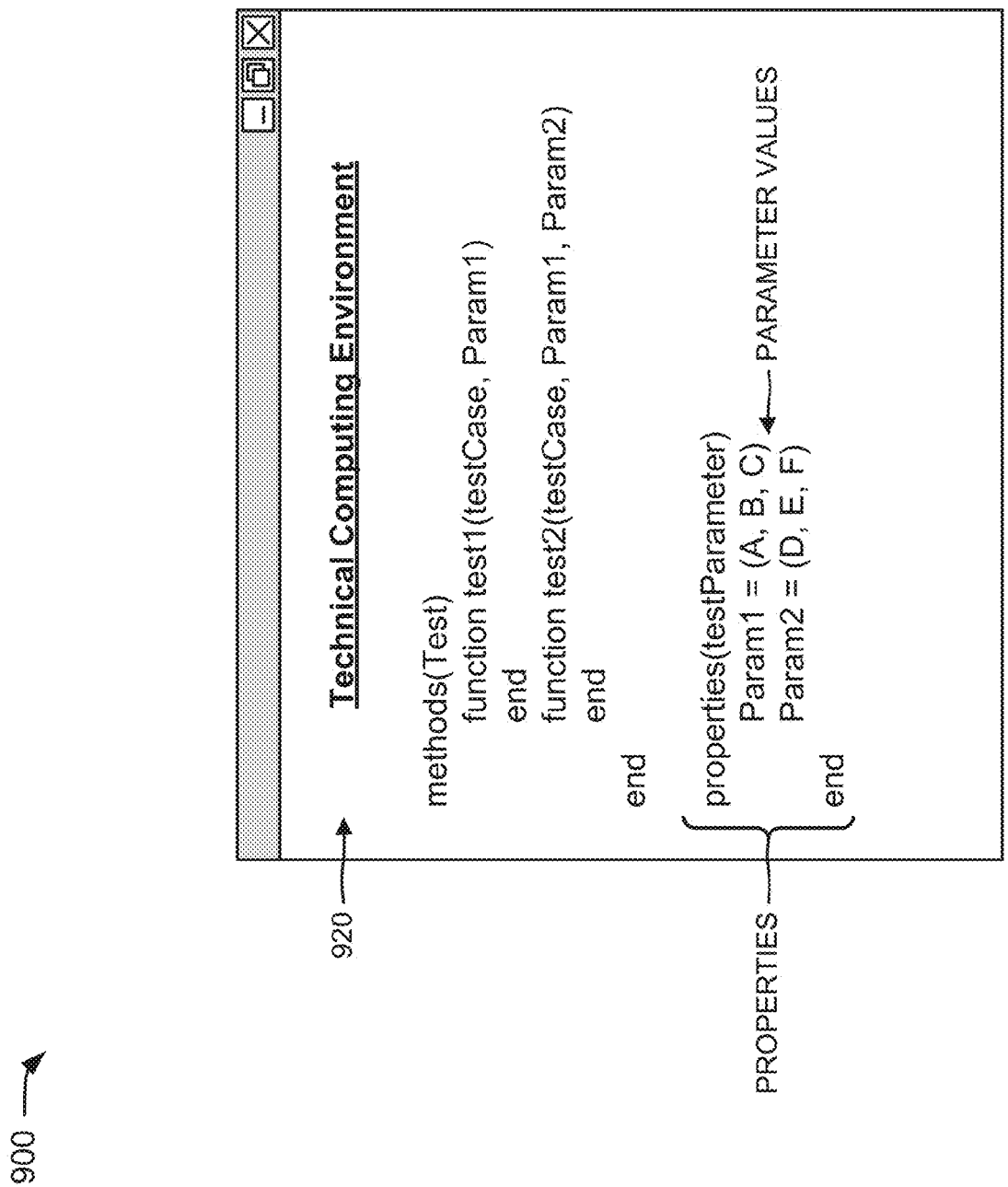

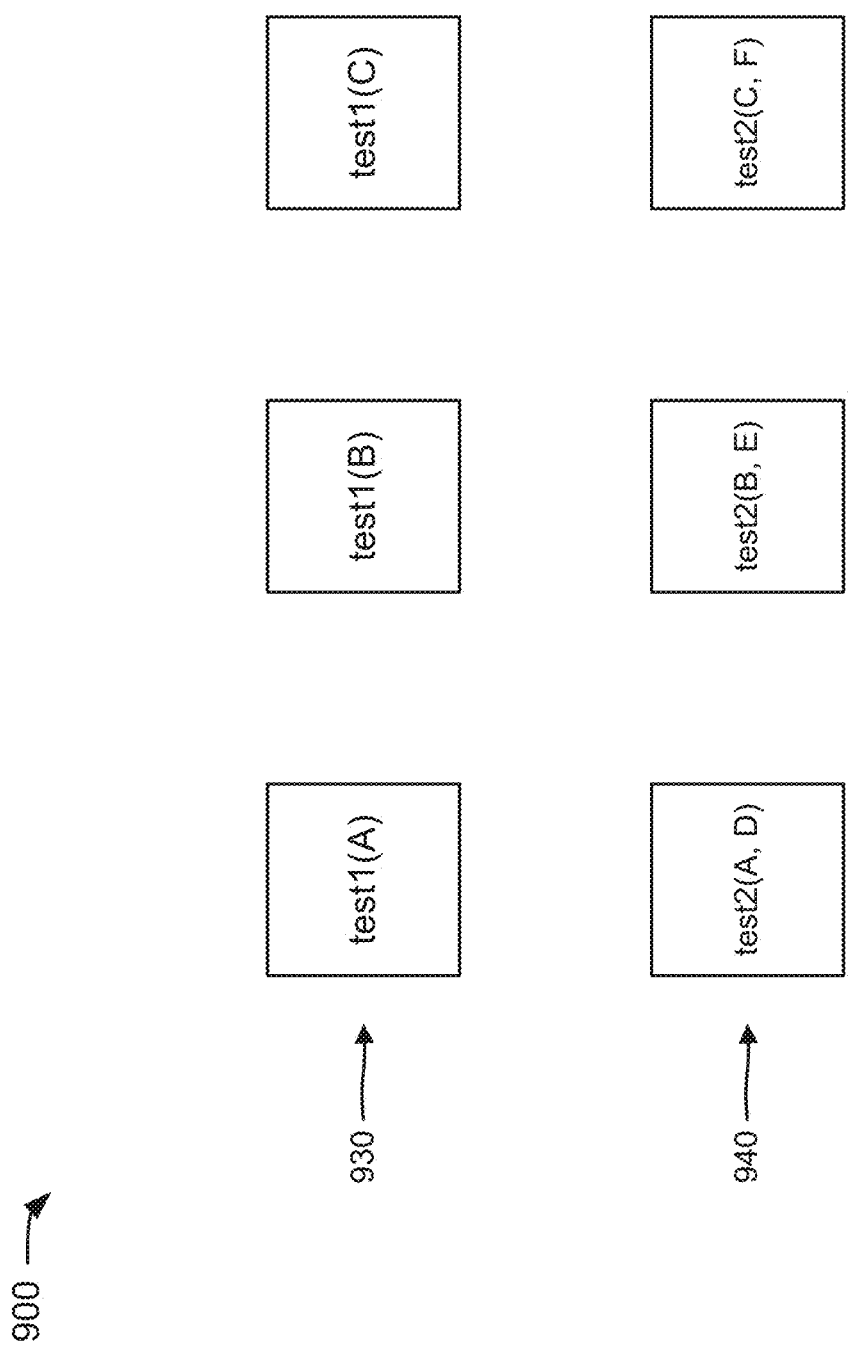

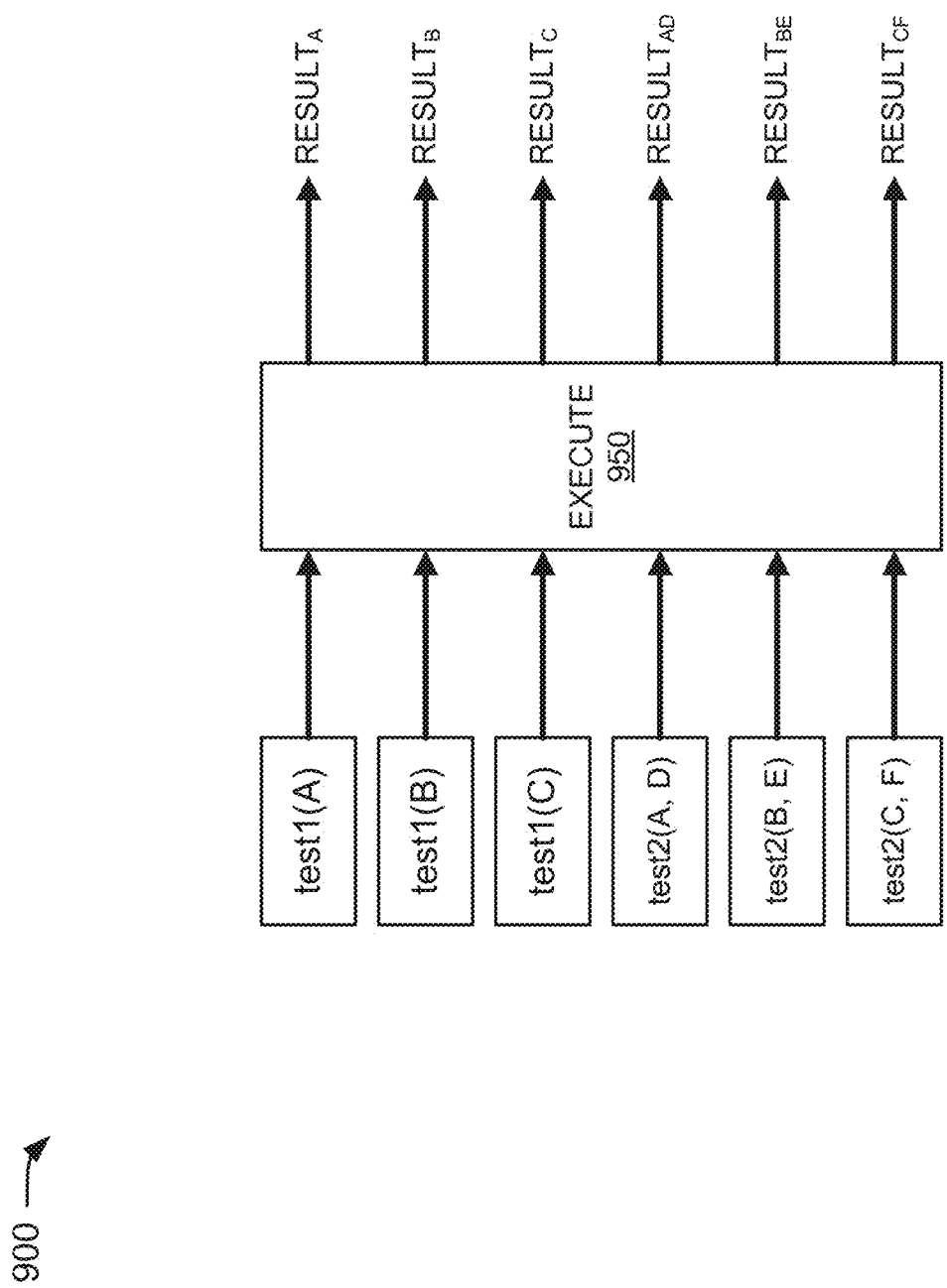

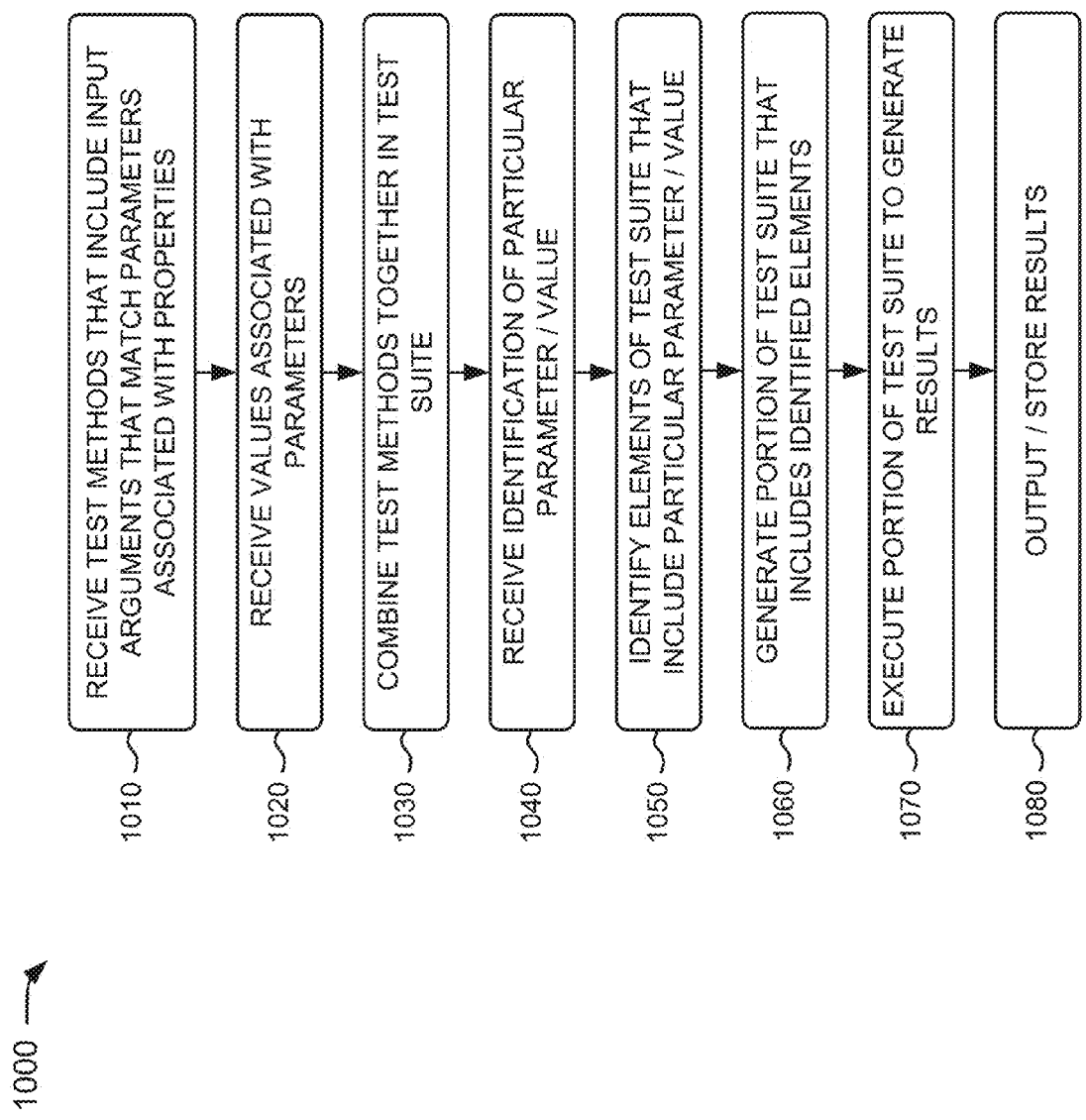

FIG. 11A

Technical Computing Environment

```
classdef TestArrayFunctions < TestCase
  properties(TestParameter)
    Fcn = struct('zeros', @zeros, ...
                 'ones', @ones, ...
                 'eye', @eye);
    Size = struct('empty', [0, 0], ...
                  'scalar', [1, 1]);
  end
  methods(Test)
    function testFunction(testCase, Fcn, Size)
      testCase.verifySize(Fcn(Size), Size);
    end
  end
end
```

1110

PARAMETER VALUES

TEST METHODS

```
Technical Computing Environment

>> subsuite =
suite.selectIf('ParameterValue',IsEqualTo('ones'))
subsuite =
        1x2 Test array with properties:
            Name
            Parameterization >> {subsuite.Name}  % look at suite element names
ans =
    'TestArrayFunctions/testFunction(Fcn=ones, Size=empty)'
    'TestArrayFunctions/testFunction(Fcn=ones, Size=scalar)'
```

1140 →

1100 →

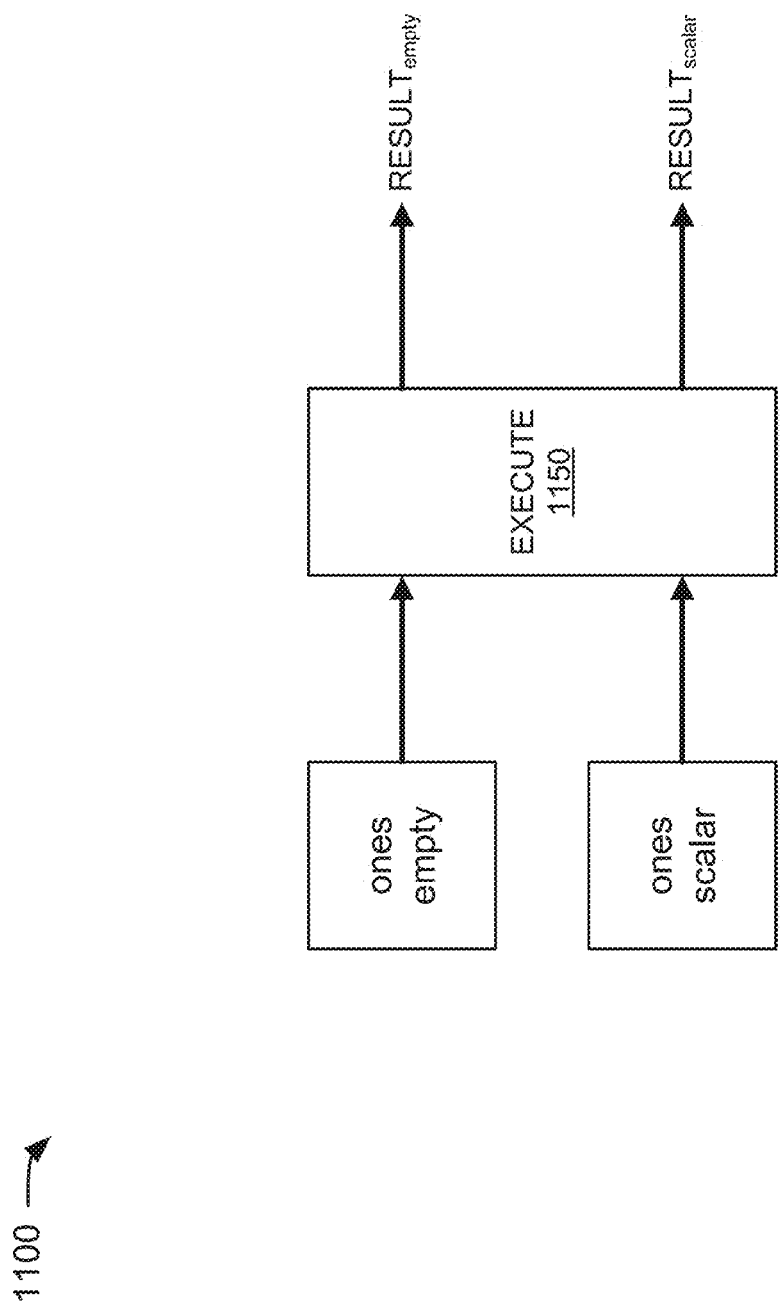

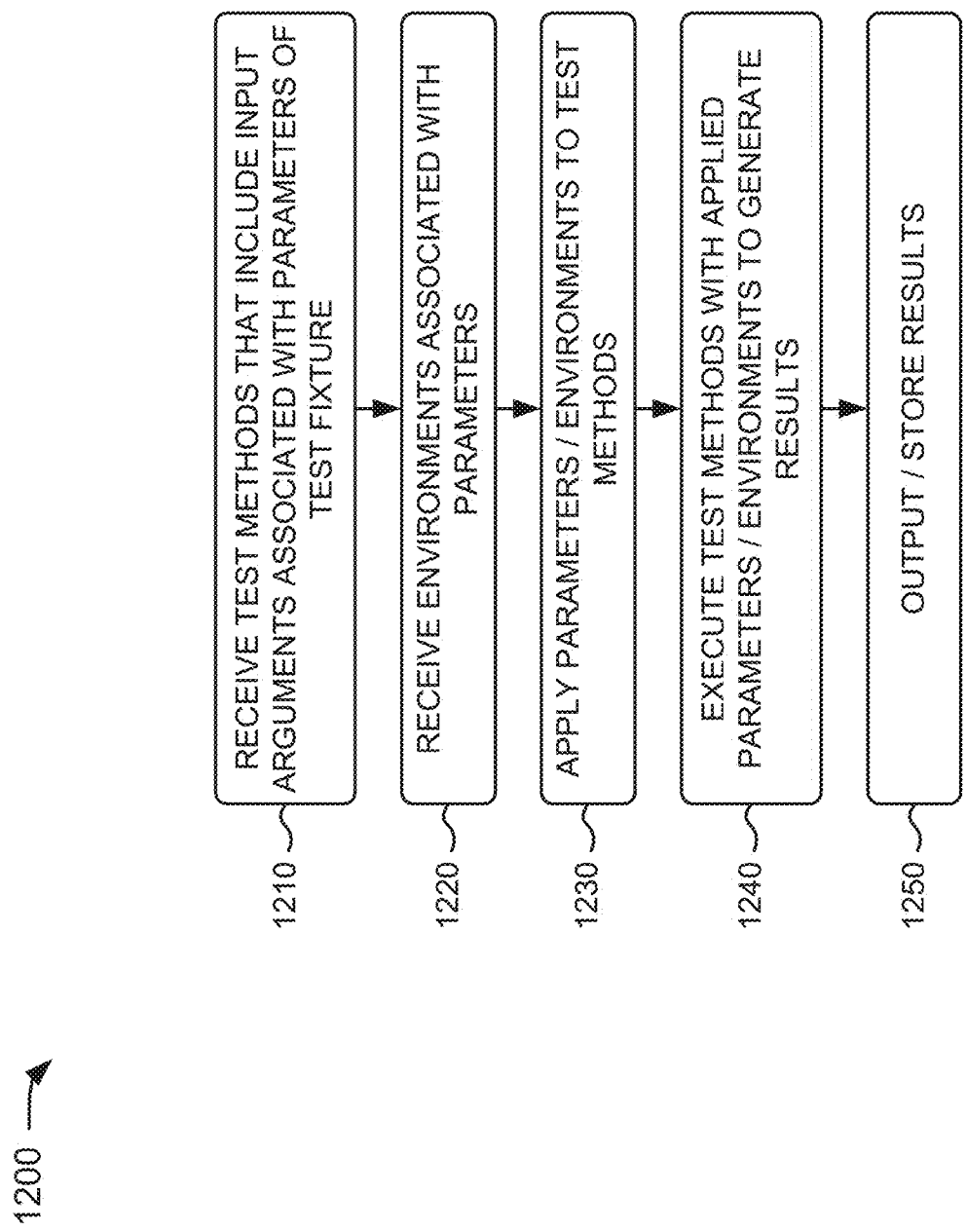

COMBINATION AND REUSE OF PARAMETERS IN AN AUTOMATED TEST ENVIRONMENT

BRIEF DESCRIPTION OF THE DRAWINGS

The accompanying drawings, which are incorporated in and constitute a part of this specification, illustrate one or more implementations and, together with the description, explain these implementations. In the drawings:

FIG. 6 is a flow chart of an example process for selecting portions of a parameterized test;

FIGS. 7A-7D are diagrams of an example of the process described in connection with FIG. 6;

FIGS. 9A-9D are diagrams of an example of the process described in connection with FIG. 8;

FIG. 10 is a flow chart of an example process for selecting and executing portions of a parameterized test in an automated test environment;

FIGS. 11A-11E are diagrams of an example of the process described in connection with FIG. 10;

FIG. 12 is a flow chart of an example process for utilizing parameterized test fixtures in an automated test environment.

DETAILED DESCRIPTION

The following detailed description refers to the accompanying drawings. The same reference numbers in different drawings may identify the same or similar elements.

Software testing is the process used to measure the quality of developed computer software or code. One type of testing, unit testing, involves testing fundamental units of the software. Unit testing may be carried out by writing automated test code that executes a fundamental unit and checks inputs and outputs of the fundamental unit, one detail at a time. Such automated test code may enable programmers to verify portions of the software. Frameworks used to manage automated test code are referred to as code-driven testing frameworks.

An example of such frameworks is the xUnit framework, which includes a JUnit framework and a NUnit framework. The xUnit framework enables testing of different elements (e.g., units) of software, such as functions and classes. The xUnit framework may provide an automated solution that eliminates a need for a programmer to write the same tests many times and to remember what should be a result of each test. However, the xUnit framework fails to provide test parameter (e.g., input values, output values, conditions, etc.) customization and reuse. For example, the JUnit framework requires that all test methods in a test class use the same test parameters, and the NUnit framework does not permit both reuse and combination of separately-defined test parameters. Furthermore, the JUnit framework executes an entire parameterized test as a monolithic unit, and cannot execute a portion of the parameterized test.

Overview

Systems and/or methods described herein may provide a mechanism to define parameter values and to specify which test methods use the parameters. Each parameter may be defined separately and each test method may independently use any number of parameters defined in a test. The systems and/or methods may enable a particular portion of a parameterized test to be executed, such as a portion of the test that utilizes a particular parameter and/or parameter value. The systems and/or methods may enable shared test fixtures (e.g., mechanisms to set up environmental conditions to execute a test) to be parameterized so that a test may be executed multiple times in different environments.

Figure 1:
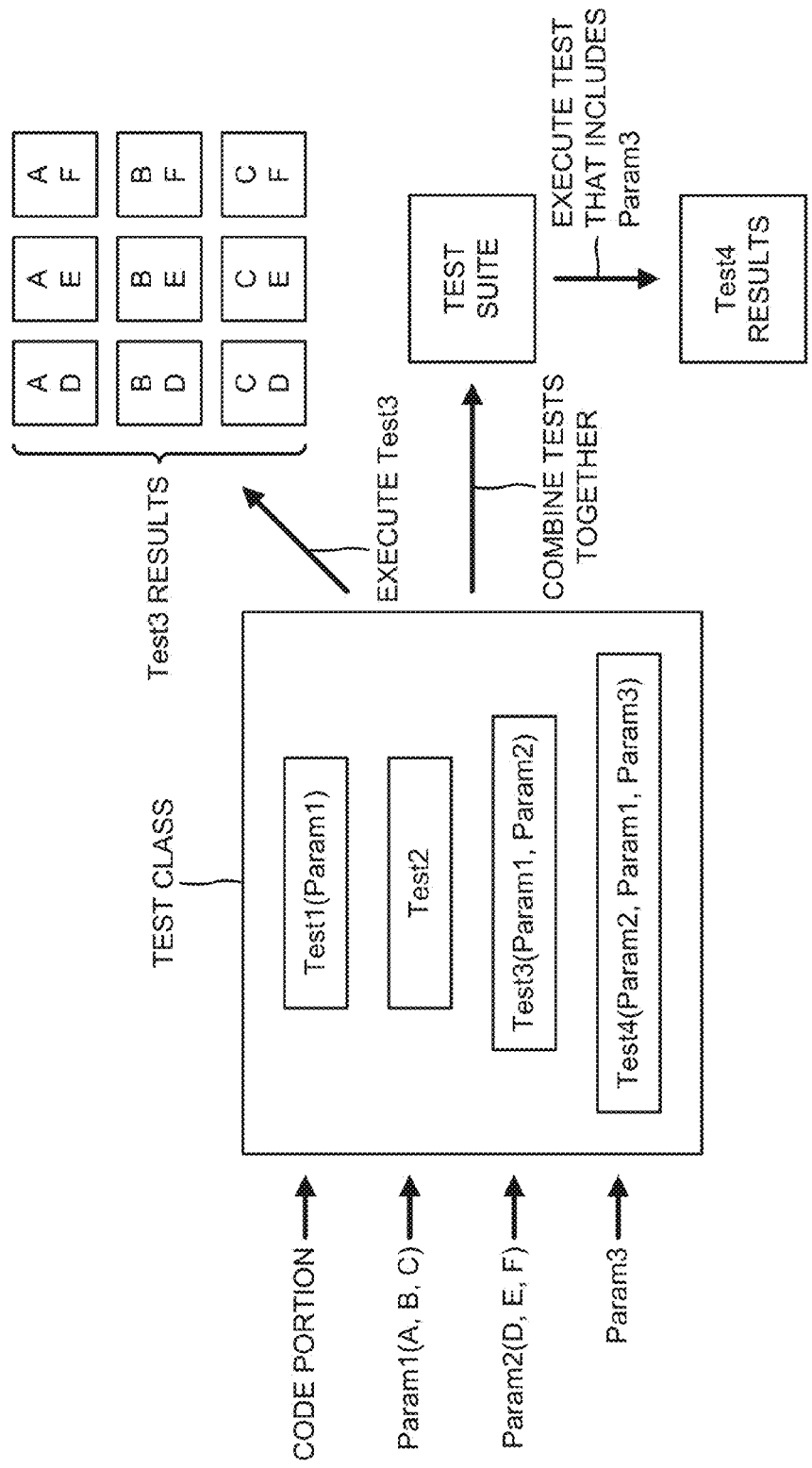
FIG. 1 is a diagram of an overview of example implementations described herein.

FIG. 1 is a diagram of an overview of example implementations described herein. For the overview, assume that a device receives a portion of code to be tested, a first test parameter (e.g., Param1), a second test parameter (e.g., Param2), and a third test parameter (e.g., Param3). The code portion, for example, may include all or a portion of code written in a dynamically-typed programming language. The first test parameter may include three values (e.g., A, B, and C), and the second test parameter may include three different values (e.g., D, E, and F). In some implementations, the test parameters may be associated with environments of a test fixture. A test fixture may provide a means to set up environmental conditions for executing a test method. The environment may include, for example, a compiler used for compiling the code portion.

A user of the device may create a test class that includes one or more test methods. For overview, assume that the user includes four test methods (e.g., Test1, Test2, Test3, and Test4) in the test class. The first test method (e.g., Test1) may include an input argument that matches the first test parameter (e.g., Param1). The second test method (e.g., Test2) may not include an input argument. The third test method (e.g., Test3) may include input arguments that match the first and second test parameters (e.g., Param1 and Param2). The fourth test method (e.g., Test4) may include input arguments that match the first, second, and third test parameters (e.g., Param1, Param2, and Param3).

The device may apply the test parameters and values to the test methods based on the input arguments of the test methods. For example, the device may apply the first test parameter (e.g., Param1) and the second test parameter (e.g., Param2) to the third test method (e.g., Test3) since the input arguments of the third test method match the first and second test parameters. In some implementations, the device may apply the test parameters/values in different combinations (e.g., since there are three first test parameter values and three second test parameter values, the device may generate nine different combinations). The device may execute the third test method with the applied test parameters to generate results for the third test, and may output and/or store the results. As shown in FIG. 1, the results may include a result for each of the nine different combinations of the test parameter values (e.g., A/D, A/E, A/F, B/D, B/E, B/F, C/D, C/E, and C/F).

In some implementations, the device may combine the test methods together into a test suite, and the user may identify a particular test parameter (or parameter value), such as the third test parameter (Param3). The device may identify a portion of the test suite that includes the particular test parameter. For example, the device may identify the fourth test method as the only test method that includes the third test parameter. The device may execute the fourth test method to generate results, and may output and/or store the results for the fourth test method as further shown in FIG. 1.

Such an arrangement may enable the user to apply parameters to any subset of test methods in a test class, and to apply different parameters to different test methods. The user may reuse parameters among multiple test methods, and may combine the parameters in different ways. The arrangement may also enable the user to execute portions of a test method that utilize a particular test parameter and/or parameter value. The arrangement may enable the user to parameterize a shared test fixture so that when a test class is executed, all content that uses the shared test fixture may be executed together as one group.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a client device (e.g., via a touch screen display, a mouse, a keyboard, a keypad, voice commands, etc.).

The term code, as used herein, is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

Figure 2:
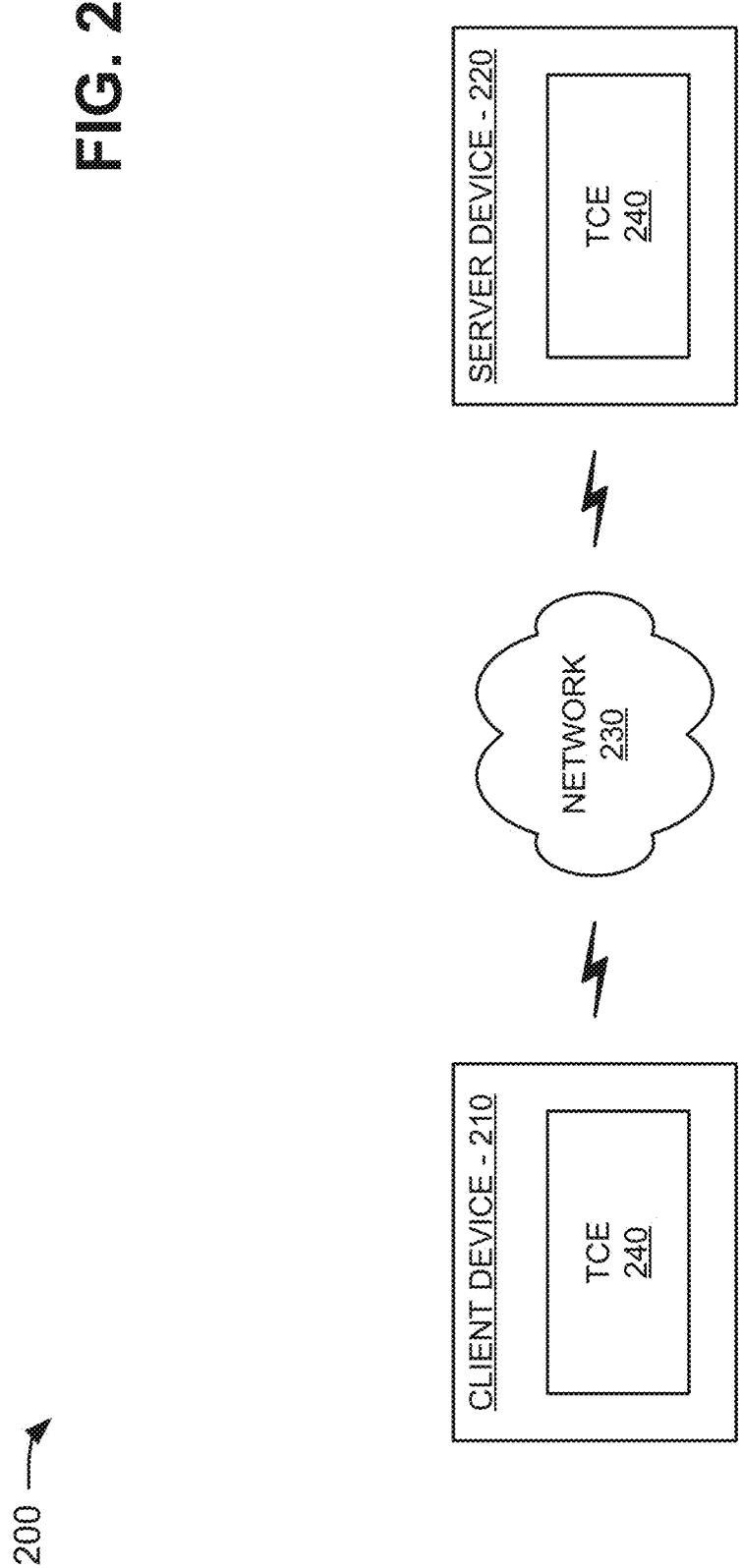
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices. In some implementations, client device 210 may include a technical computing environment (TCE) 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

Figure 3:
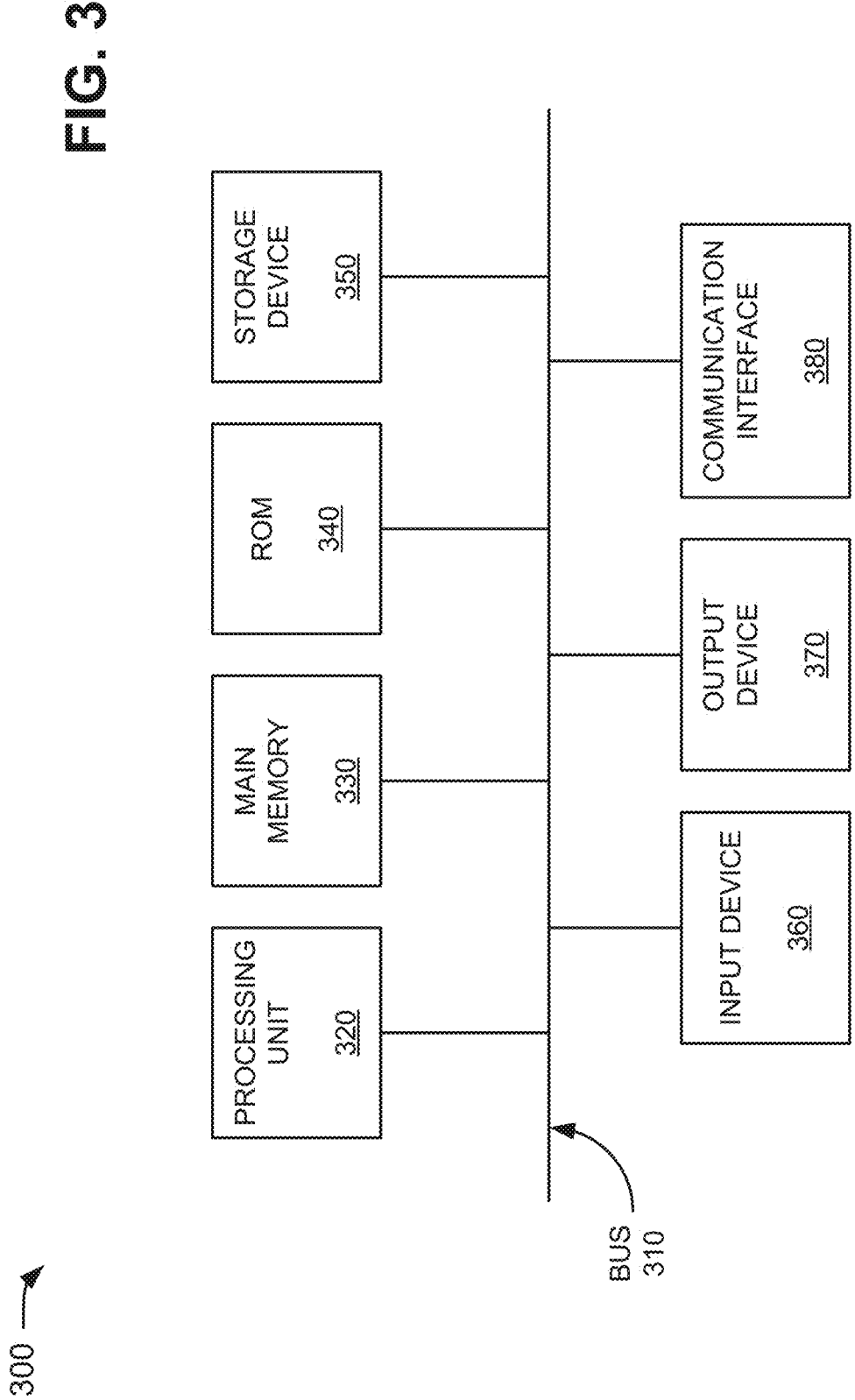
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
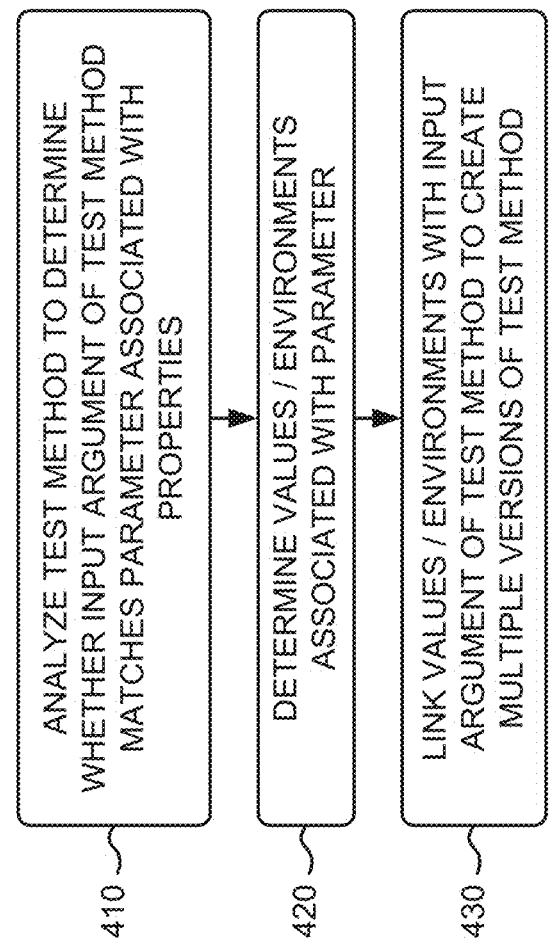
FIG. 4 is a flow chart of an example process for linking parameter values and/or environments with an input argument of a test method.

Example Process for Linking Parameter Values/Environments with a Test Method FIG. 4 is a flow chart of an example process 400 for linking parameter values and/or environments with an input argument of a test method. In some implementations, process 400 may be performed by client device 210 (e.g., TCE 240). In some implementations, process 400 may be performed by another device or a group of devices (e.g., server device 220) separate from or including client device 210.

As shown in FIG. 4, process 400 may include analyzing a test method to determine whether an input argument of the test method matches a parameter associated with a property (block 410). For example, a user of client device 210 may provide a test method to an environment (e.g., TCE 240) of client device 210. The test method may be used to test one or more portions of code generated via TCE 240. In some implementations, the test method may include syntax of a general form:

function test(testCase, Param), where test may correspond to the test method, and Param may correspond to an input argument of the test method. Client device 210/TCE 240 may receive the test method, and may store the test method in a memory (e.g., main memory 330, ROM 340, and/or storage device 350 of FIG. 3) associated with client device 210. In some implementations, client device 210/TCE 240 may retrieve the test method from the memory.

In some implementations, the user may provide parameter properties to client device 210/TCE 240. The parameter properties may include syntax of a general form:

properties(TestParameter)

Param=(A, B, C);

end, where properties may correspond to the parameter properties, TestParameter may correspond to properties being used as test parameters, Param may correspond to a test parameter name, and A, B, and C may correspond to parameter values. Client device 210/TCE 240 may receive the parameter properties, and may store the parameter properties in the memory associated with client device 210. In some implementations, client device 210/TCE 240 may retrieve the parameter properties from the memory.

In some implementations, the user may provide test fixture properties to client device 210/TCE 240. The test fixture properties may include syntax of a general form:

properties (ClassSetupParameter)

Param=(x1, x2);

end, where properties may correspond to the test fixture properties, ClassSetupParameter may correspond to properties being used as test fixture parameters, Param may correspond to a test parameter name, and x1 and x2 may correspond to parameter values that may be used to set up different environmental states. Client device 210/TCE 240 may receive the test fixture properties, and may store the test fixture properties in the memory associated with client device 210. In some implementations, client device 210/TCE 240 may retrieve the test fixture properties from the memory.

In some implementations, client device 210 may analyze the test method (e.g., test) to determine whether the input argument (e.g., Param) of the test method matches the parameter name (e.g., Param) associated with the properties (e.g., properties(TestParameter)). Based on the analysis, client device 210 may determine that the input argument of the test method matches the parameter associated with the properties. In some implementations, client device 210 may analyze the test method (e.g., test) to determine whether the input argument (e.g., Param) of the test method matches the parameter name (e.g., Param) associated with the test fixture parameter (e.g., properties(ClassSetupParameter)). Based on the analysis, client device 210 may determine that the input argument of the test method matches the parameter associated with the test fixture.

As further shown in FIG. 4, process 400 may include determining values and/or environments associated with the parameter (block 420). For example, client device 210 may determine parameter values (e.g., A, B, and C) associated with the parameter name (e.g., Param). In some implementations, client device 210 may determine the parameter values only when the input argument of the test method matches the parameter name associated with the properties. Client device 210 may determine parameter values (e.g., x1 and x2) associated with the parameter name (e.g., Param). In some implementations, client device 210 may determine the parameter environments only when the input argument of the test method matches the parameter name associated with the test fixture.

As further shown in FIG. 4, process 400 may include linking the values and/or environments with the input argument of the test method to create multiple versions of the test method (block 430). For example, client device 210 may link the parameter values (e.g., A, B, and C) with the input argument (e.g., Param) of the test method (e.g., test) to create multiple versions of the test method. In some implementations, the test method may include a first version for the first parameter value (e.g., A), a second version for the second parameter value (e.g., B), and a third version for the third parameter value (e.g., C). In some implementations, client device 210 may link the parameter values (e.g., x1 and x2) with the input argument (e.g., Param) of the test method (e.g., test) to create set up different environmental states that may be used by the test methods in the class. In some implementations, the test method may include a first version for the first parameter environment (e.g., x1) and a second version for the second parameter environment (e.g., x2).

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example Linking of Parameter Values/Environments with a Test Method

Figure 5A:
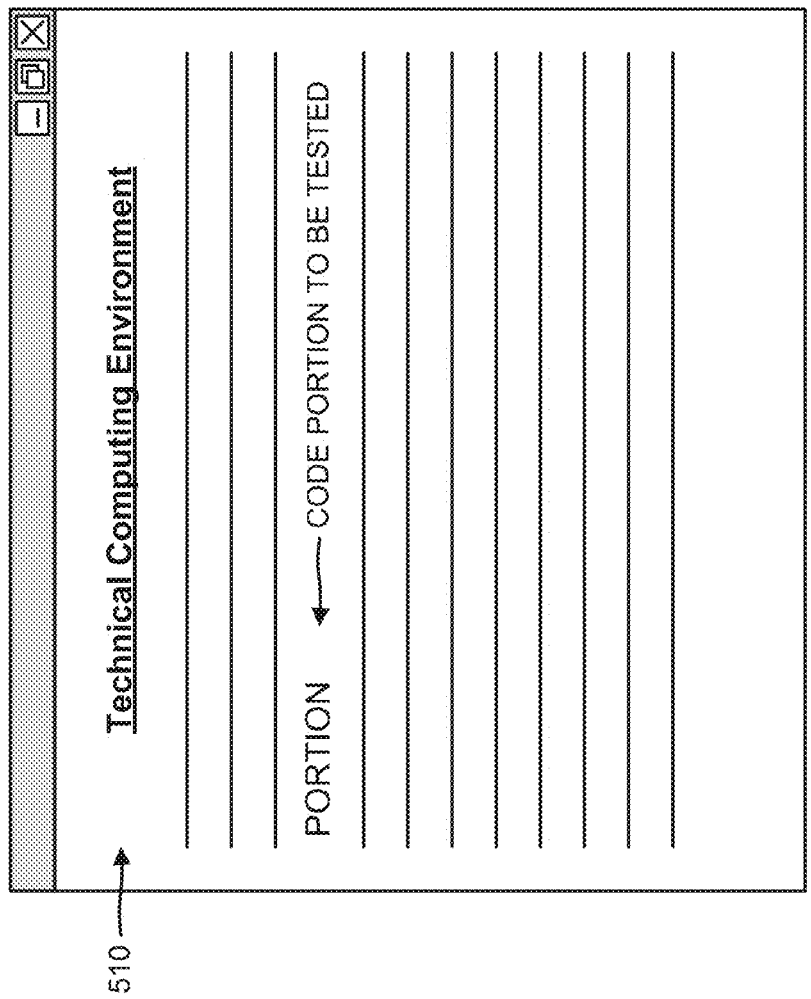
FIGS. 5A-5D are diagrams of an example of the process described in connection with FIG. 4.

FIGS. 5A-5D are diagrams of an example 500 of the process described above with respect to FIG. 4. In example 500, assume that client device 210 provides a user interface 510 for display to a user, as shown in FIG. 5A. User interface 510 may enable the user to input code input via TCE 240, and may include information that enables a user to select a portion of the code. For example, user interface 510 may enable the user to select a code portion (e.g., testFunction) from the code so that the code portion may be tested by one or more test methods.

Figure 5B:
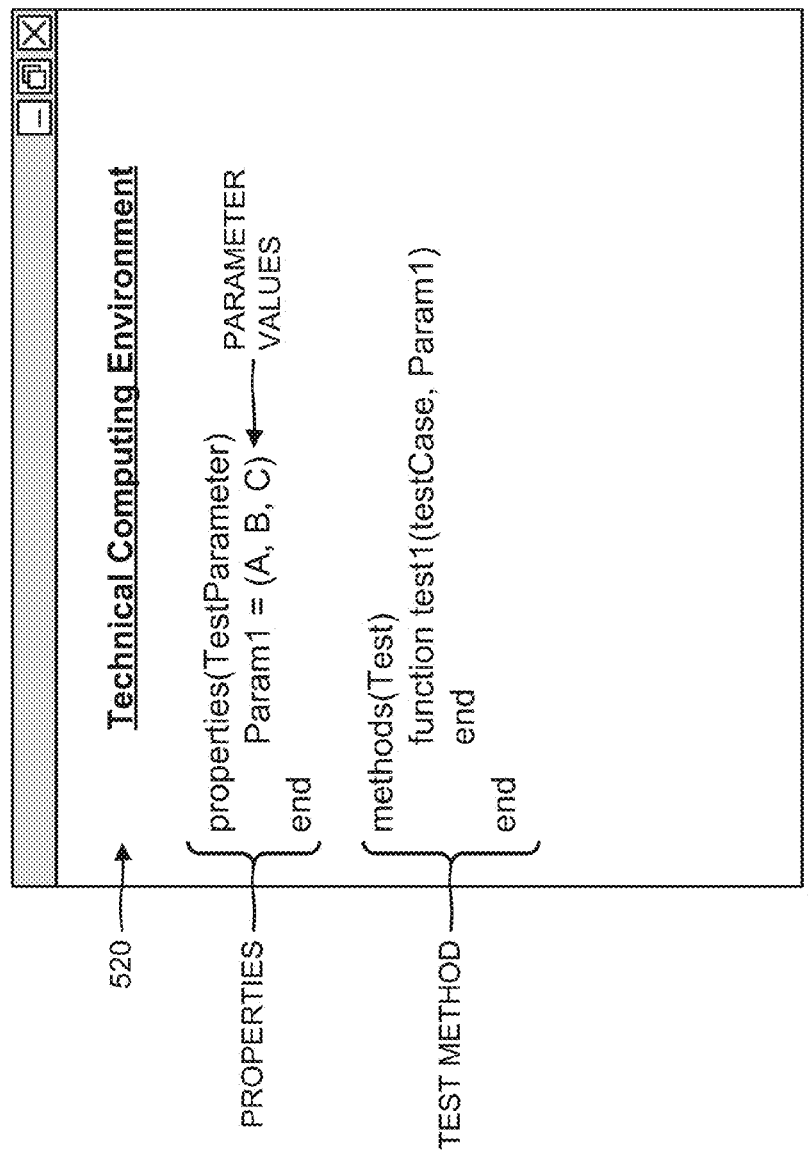

In example 500, assume further that the user utilizes TCE 240 to input parameter properties, as shown in a user interface 520 of FIG. 5B. For example, the user may input the following parameter properties:
properties(TestParameter)
    Param1=(A, B, C);
end,
where properties may correspond to the parameter properties, TestParameter may correspond to properties being used as test parameters, Param may correspond to a test parameter name, and A, B, and C may correspond to parameter values.

Assume further that the user utilizes TCE 240 to input a test method, as further shown in user interface 520. For example, the user may input the following test method:
methods(Test)
    function test1(testCase, Param1)
    end
end,
where test1 may correspond to the test method, testCase is an object instance, and Param1 may correspond to an input argument of the test method.

Figure 5C:
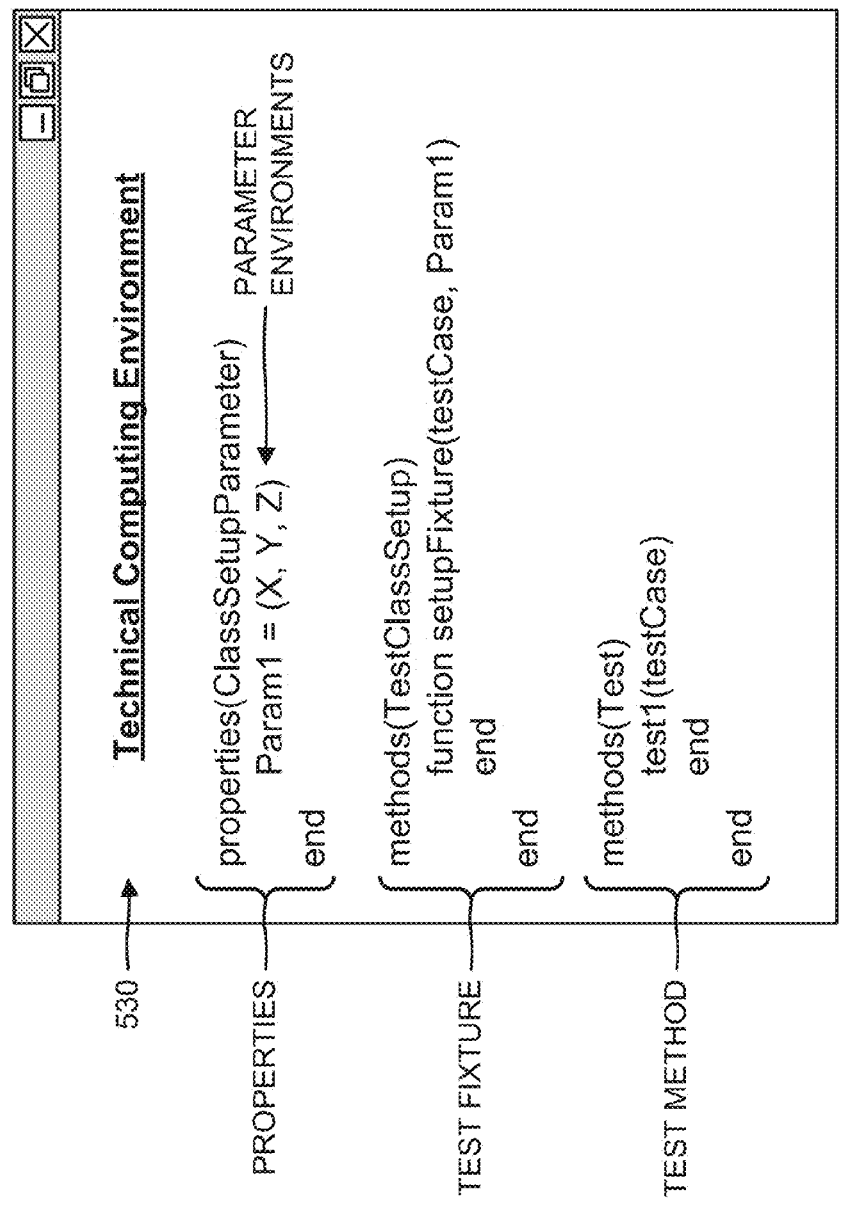
Figure 5D:
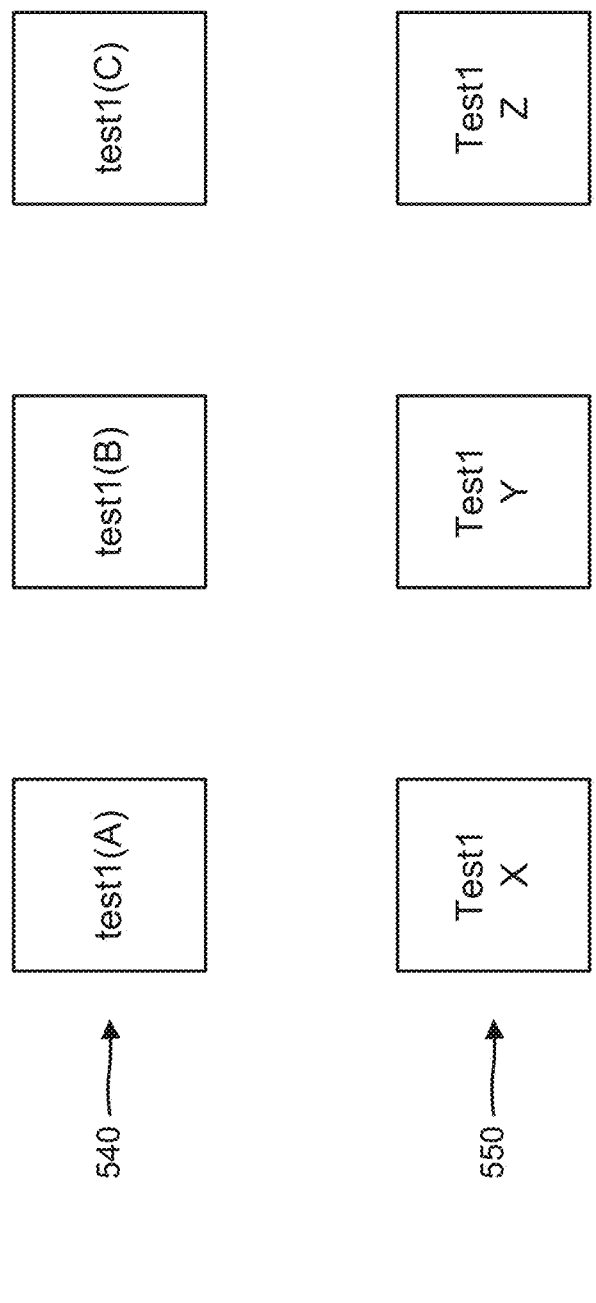

In example 500, assume that the user utilizes TCE 240 to input test fixture properties, as shown in a user interface 530 of FIG. 5C. For example, the user may input the following test fixture properties:
properties (ClassSetupParameter)
    Param1=(X, Y, Z)
end,
where properties may correspond to the test fixture properties, ClassSetupParameter may correspond to properties being used as test fixture parameters, Param1 may correspond to a test parameter name, and X, Y, and Z may correspond to parameter values that may be used to set up different environmental states.

Assume further that the user utilizes TCE 240 to input a test fixture, as further shown in user interface 530. For example, the user may input the following test fixture:
methods (TestClassSetup)
    function setupFixture(testCase, Param1)
    end
end,
where setupFixture may correspond to a method that sets up the test fixture, testCase may correspond to the test case instance, and Param1 may correspond to an input argument of the setupFixture method which sets up the test fixture in different ways depending on the value of Param1. Assume further that the user utilizes TCE 240 to input a test method, as further shown in user interface 530. For example, the user may input the following test method:
methods (Test)
    function test1(testCase)
    end
end,
where testCase may correspond to the test case instance, and test1 may correspond to the test method.

In example 500, client device 210 may determine parameter values (e.g., A, B, and C) associated with the parameter name (e.g., Param1). In some implementations, client device 210 may link the parameter values (e.g., A, B, and C) with the input argument (e.g., Param1) of the test method (e.g., test1) to create multiple versions of the test method. For example, as indicated by reference number 540 in FIG. 5D, the test method (e.g., test1) may include a first version for the first parameter value (e.g., A), a second version for the second parameter value (e.g., B), and a third version for the third parameter value (e.g., C).

In some implementations, client device 210 may determine parameter values (e.g., X, Y, and Z) associated with the parameter name (e.g., Param1). Client device 210 may link the parameter values (e.g., X, Y, and Z) with the input argument (e.g., Param1) of the test method (e.g., test1) to create multiple versions of the test class. For example, as indicated by reference number 550 in FIG. 5D, the test method (e.g., test1) may include a first version for the first parameter value (e.g., X), a second version for the second parameter value (e.g., Y), and a third version for the third parameter value (e.g., Z). In some implementations, the test method may be invoked after the setupFixture method has been called for a value of the ClassSetupParameter. For example, assume there is a second test method (e.g., test2), then a sequence of code execution may include the following: setupFixture(testCase,X); test1(testCase); test2(testCase); setupFixture(testCase,Y); test1(testCase); test2(testCase); setupFixture(testCase,Z); test1(testCase); and test2(testCase).

As indicated above, FIGS. 5A-5D are provided merely as an example. Other examples are possible and may differ from what was described with regard to FIGS. 5A-5D.

Example Process for Selecting Portions of a Parameterized Test

FIG. 6 is a flow chart of an example process 600 for selecting portions of a parameterized test. In some implementations, process 600 may be performed by client device 210 (e.g., TCE 240). In some implementations, process 600 may be performed by another device or a group of devices (e.g., server device 220) separate from or including client device 210.

As shown in FIG. 6, process 600 may include analyzing a test suite to determine parameters associated with test methods of the test suite (block 610). For example, client device 210/TCE 240 may receive one or more test methods from a user associated with client device 210, from an external device, etc. In some implementations, the user may input the test methods to client device 210 via TCE 240, via an external memory device (e.g., a CD ROM, a flash drive, etc.), etc. For example, client device 210 may execute a computing environment (e.g., TCE 240) that generates a user interface for inputting the test methods. Client device 210/TCE 240 may provide for display the user interface for inputting the test methods. In some implementations, client device 210 may retrieve the test methods from a memory (e.g., main memory 330, ROM 340, and/or storage device 350 of FIG. 3) associated with client device 210, and may provide the test methods to TCE 240. In some implementations, client device 210/TCE 240 may associate the test methods with a test class, and a first test method (e.g., test1) and a third test method (e.g., test3) may be associated with a test parameter (e.g., Param).

In some implementations, the user may provide parameter properties to client device 210/TCE 240. The parameter properties may include syntax of a general form:

properties (TestParameter)
   Param=(A, B, C);
end, where properties may correspond to the parameter properties, TestParameter may correspond to properties being used as test parameters, Param may correspond to a test parameter name, and A, B, and C may correspond to parameter values. Client device 210/TCE 240 may receive the parameter properties, and may store the parameter properties in the memory associated with client device 210. In some implementations, client device 210/TCE 240 may retrieve the parameter properties from the memory.

In some implementations, the user may provide a test suite command to client device 210/TCE 240. The test suite command may include syntax of a general form:

suite=TestSuite.fromClass(Test), where suite may correspond to the test suite, and TestSuite, fromClass(Test) may correspond to a test suite command that creates the test suite from the test methods provided in the test class. Client device 210/TCE 240 may receive the test suite command, and may create, based on the command, a test suite that includes a combination of the test methods.

In some implementations, client device 210 may analyze the test suite (e.g., suite) to determine parameters associated with the test methods of the test suite. For example, client device 210 may determine, based on the analysis, that the test parameter (e.g., Param) is associated with the first and third test methods (e.g., test1 and test3) of the test suite (e.g., suite).

As further shown in FIG. 6, process 600 may include receiving identification of a particular parameter (block 620). For example, client device 210/TCE 240 may receive identification of a particular parameter from the user associated with client device 210, from an external device, etc. In some implementations, the user may input the identification of the particular parameter to client device 210 via TCE 240, via an external memory device (e.g., a CD ROM, a flash drive, etc.), etc. For example, the user may identify the test parameter (e.g., Param) as the particular parameter. In some implementations, the identification may include syntax of a general form:

subsuite=suite.selectIf('ParameterName', IsEqualTo ('Param')), where subsuite may correspond to a portion of the test suite, suite.selectIf may correspond to a command that identifies elements of the test suite when the parameter name is equal to the particular parameter (e.g., Param).

As further shown in FIG. 6, process 600 may include identifying elements of the test suite that include the particular parameter (block 630). For example, client device 210 may identify elements or a portion of the test suite (e.g., suite) that include the particular parameter (e.g., Param). In some implementations, the portion of the test suite may include the first and third test methods (e.g., test1 and test3) of the test suite since the first and third test methods are associated with the particular parameter.

Returning to FIG. 6, process 600 may include generating a portion of the test suite that includes the identified elements (block 640). For example, client device 210 may generate a portion (e.g., subsuite) of the test suite that includes the first test method (e.g., test1) and the third test method (e.g., test3). In some implementations, client device 210 may display the portion of the test suite to the user. In some implementations, client device 210 may execute all the parameter values of a particular parameter, a subset of the parameter values of the particular parameter, set of parameters, etc.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Selection of Portions of a Parameterized Test

Figure 7C:
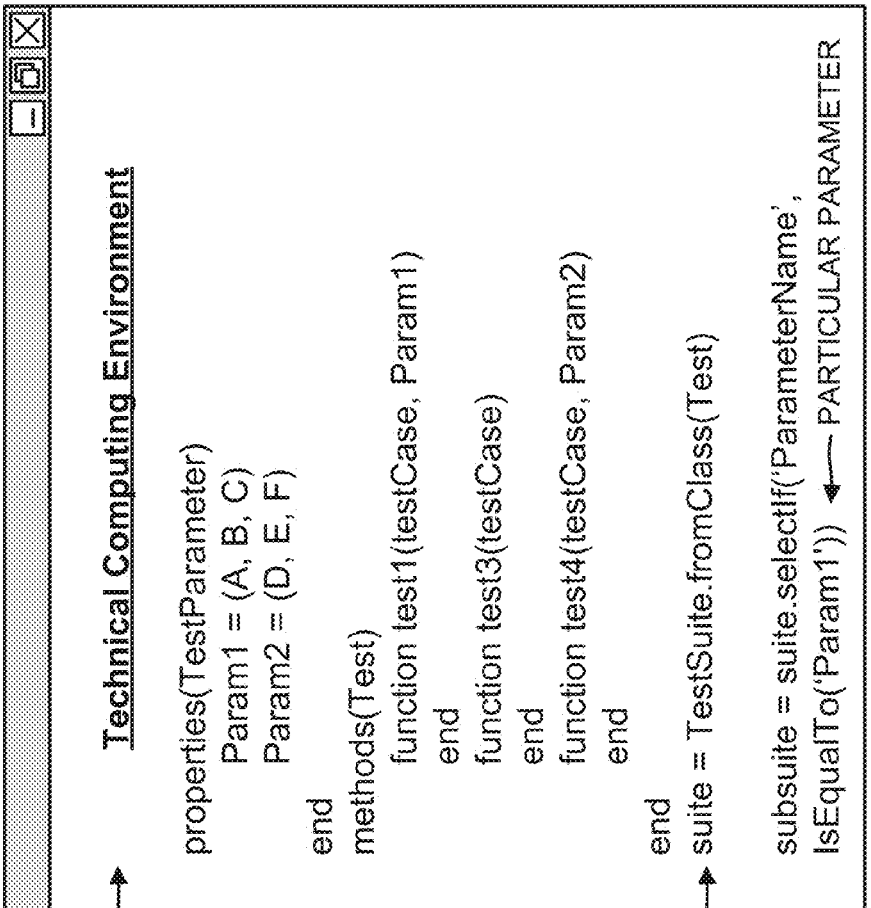

FIGS. 7A-7D are diagrams of an example 700 of the process described above with respect to FIG. 6. In example 700 and as shown in FIG. 7A, assume that client device 210 executes a computing environment (e.g., TCE 240) that generates a user interface 710 for inputting parameter properties, test methods, and/or a test suite. Client device 210/TCE 240 may display user interface 710 so that a user may input the parameter properties, the test methods, and/or the test suite. In example 700 and as shown in FIG. 7A, assume that the user inputs the following parameter properties:

properties(TestParameter)
   Param1=(A, B, C)
   Param2=(D, E, F)
end, where properties may correspond to the parameter properties, TestParameter may correspond to properties being used as test parameters, Param1 may correspond to a first test parameter name, Param2 may correspond to a second test parameter name, A, B, and C may correspond to parameter values for the first test parameter, and D, E, and F may correspond to parameter values for the second test parameter.

As further shown in FIG. 7A, assume that the user inputs the following test methods:

methods(Test)
   function test1(testCase, Param1)
   end
   function test3(testCase)
   end
   function test4(testCase, Param2)
   end
end, where test1 may correspond to a first test method, Param1 may correspond to a first input argument of the first test method, test3 may correspond to a third test method, test4 may correspond to a fourth test method, and Param2 may correspond to a second input argument of the fourth test method.

As further shown in FIG. 7A, assume that the user inputs the following test suite:

suite=TestSuite.fromClass(Test), where suite may correspond to the test suite, and TestSuite, fromClass(Test) may correspond to a test suite command that creates the test suite from the test methods. Client device 210/TCE 240 may receive the test suite command, and may create, based on the command, a test suite that includes a combination of the test methods.

For example, as shown in FIG. 7B, client device 210/TCE 240 may create a test suite that includes elements 720. Elements 720 may include a combination of the test methods. For example, as shown in FIG. 7B, elements 720 may include the first test method (e.g., test1) implementing the parameter values (e.g., A, B, and C) for the first test parameter (e.g., Param1); the third test method (e.g., test3); and the fourth test method (e.g., test4) implementing the parameter values (e.g., D, E, and F) of the second test parameter (e.g., Param2).

In example 700 and as shown in FIG. 7C, assume that client device 210 executes a computing environment (e.g., TCE 240) that generates a user interface 730 for inputting identification of a particular parameter or a particular parameter value. For example, the user may identify the particular parameter or parameter value when the user wants to execute only the test methods that reference the particular parameter or parameter value. In example 700 and as shown in FIG. 7C, assume that the user inputs the following identification:

subsuite=suite.selectIf('ParameterName', IsEqualTo ('Param1')), where subsuite may correspond to a portion of the test suite, suite.selectIf may correspond to a command that identifies elements of the test suite when the parameter name is equal to the particular parameter (e.g., Param1).

In example 700, assume that client device 210 identifies, based on the suite.selectIf command, elements 720 of the test suite (e.g., suite) that include the particular parameter (e.g., Param1). For example, as shown in FIG. 7D, client device 210 may create a test subsuite 740 from elements 720 of the test suite. Test subsuite 740 may include elements 720 associated with the first test method (e.g., test1) and the parameter values (e.g., A, B, and C) for the first test parameter (e.g., Param1).

As indicated above, FIGS. 7A-7D are provided merely as an example. Other examples are possible and may differ from what was described with regard to FIGS. 7A-7D.

Figure 8:
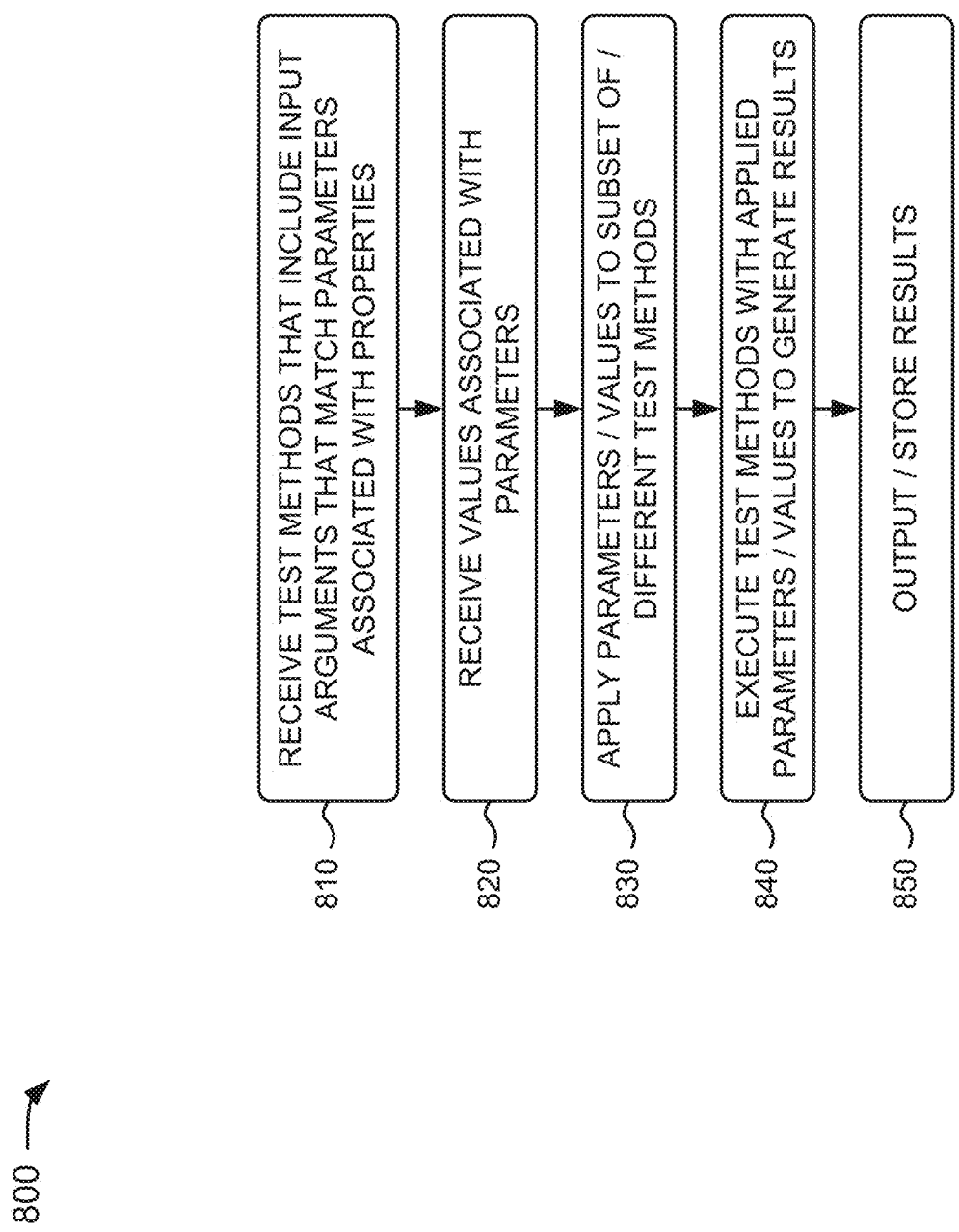
FIG. 8 is a flow chart of an example process for combining and reusing parameters in an automated test environment.

Example Process for Combining and Reusing Parameters in an Automated Test Environment FIG. 8 is a flow chart of an example process 800 for combining and reusing parameters in an automated test environment. In some implementations, process 800 may be performed by client device 210 (e.g., TCE 240). In some implementations, process 800 may be performed by another device or a group of devices (e.g., server device 220) separate from or including client device 210.

As shown in FIG. 8, process 800 may include receiving test methods that include input arguments that match parameters associated with properties (block 810). For example, a user of client device 210 may provide test methods to an environment (e.g., TCE 240) of client device 210. The test methods may be used to test one or more portions of code generated via TCE 240. In some implementations, the test methods may include syntax of a general form:

methods(Test)
　function test1(testCase, Param1)
　end
　function test2(testCase)
　end
　function test3(testCase, Param1, Param2)
　end
　function test4(testCase, Param2, Param1, Param3)
　end
end, where testCase may correspond to a test cast instance passed into the test methods, test1 may correspond to a first test method, test2 may correspond to a second test method, test3 may correspond to a third test method, test4 may correspond to a fourth test method, and Param1, Param2, and Param3 may correspond to input arguments of the test methods. Client device 210/TCE 240 may receive the test methods, and may store the test methods in a memory (e.g., main memory 330, ROM 340, and/or storage device 350 of FIG. 3) associated with client device 210. In some implementations, client device 210/TCE 240 may retrieve the test methods from the memory.

As further shown in FIG. 8, process 800 may include receiving values associated with the parameters (block 820). For example, the user may provide parameter properties to client device 210/TCE 240. The parameter properties may include syntax of a general form:

properties (TestParameter)
　Param1=(A, B, C)
　Param2=(X, Y, Z)
　Param3=(D, E, F)
end, where properties may correspond to the parameter properties, TestParameter may correspond to properties being used as test parameters, Param1 may correspond to a first test parameter name, Param2 may correspond to a second test parameter name, Param3 may correspond to a third test parameter name, and A, B, C, X, Y, Z, D, E, and F may correspond to parameter values. Client device 210/TCE 240 may receive the parameter properties, and may store the parameter properties in the memory associated with client device 210. In some implementations, client device 210/TCE 240 may retrieve the parameter properties from the memory.

In some implementations, the input arguments of the test methods may match one or more test parameters associated with the parameter properties. A definition of each test parameter may include a list of values specific to each test parameter. Each test method may utilize any of the test parameters in any order. For example, the first test method (e.g., test1) may utilize the first test parameter (e.g., Param1), and the second test method (e.g., test2) may not utilize any test parameters. The third test method (e.g., test3) may utilize the first test parameter (e.g., Param1) followed by the second test parameter (e.g., Param2). The fourth test method (e.g., test4) may utilize the second test parameter (e.g., Param2) followed by the first test parameter (e.g., Param1) and the third test parameter (e.g., Param3).

As further shown in FIG. 8, process 800 may include applying the parameters and/or the values to a subset of different test methods (block 830). For example, client device 210 may apply the parameter values (e.g., A, B, and C) to the first test method (e.g., test1) to create multiple versions of the first test method. In some implementations, the first test method may include a first version for the first parameter value (e.g., A), a second version for the second parameter value (e.g., B), and a third version for the third parameter value (e.g., C). In some implementations, client device 210 may apply the parameter values (e.g., X, Y, Z, D, E, and F) to the third test method (e.g., test3) to create multiple versions of the third test method. In some implementations, the third test method may include a first version for the parameter values (e.g., X and D), a second version for the parameter values (e.g. Y and E), and a third version for the parameter values (e.g. Z and F).

In some implementations, an input argument of a test method may define parameter(s) that the test method is to utilize and may provide the test method with value(s) for each parameter. The test method may specify a test behavior when more than one parameter is specified. For example, the test method may specify that the test method is to be invoked for every combination of values of every parameter. In some implementations, the test method may specify that the test method is to be invoked using values from corresponding indices in each list of parameter values. The nature of the combination of parameter values may be independent for each test method.

For example, for the following syntax:

```
methods(Test, ParameterCombination='exhaustive')
    function test1(testCase, Param1, Param2)
    end
end
methods (Test, ParameterCombination='sequential')
    function test2(testCase, Param1, Param2)
    end
end,
```

The two test methods (e.g., test1 and test2) may use parameters Param1 and Param2. However, the test methods may specify different ways of combining the two parameters. The first test method (e.g., test1) may be invoked nine times for the nine combinations of Param1 and Param2, as follows:

A, X
A, Y
A, Z
B, X
B, Y
B, Z
C, X
C, Y
C, Z.

The second test method (e.g., test2) may be invoked three times, using corresponding values from each list of parameter values, as follows:

A, X
B, Y
C, Z.

In some implementations, test methods may be organized into a single file that completely tests a code portion (e.g., a particular function). Some of the test methods in the file may reference parameters and other test methods in the file may not reference parameters. The arrangement described herein may enable a user to utilize parameters for any subset of the test methods in the file and to combine parameters in different ways.

Returning to FIG. 8, process 800 may include executing the test methods with the applied parameters and/or values to generate results (block 840). For example, client device 210 may execute the test methods with the applied parameter values in order generate results. In some implementations, client device 210 may execute the three versions of the first test method (e.g., test1) to generate results based on the first parameter value (e.g., A), the second parameter value (e.g., B), and the third parameter value (e.g., C). In some implementations, client device may execute the three versions of the third test method (e.g., test3) to generate results based on a first set of parameter values (e.g., X and D), a second set of parameter values (e.g. Y and E), and a third set of parameter values (e.g. Z and F). In some implementations, the third test method (e.g., test3) may execute nine times when combined exhaustively. This may be the behavior when a user does not otherwise specify.

As further shown in FIG. 8, process 800 may include outputting and/or storing the results (block 850). For example, client device 210 may output (e.g., display) the results of the execution of the test methods, and/or may store the results in a memory (e.g., main memory 330, ROM 340, and/or storage device 350 of FIG. 3) associated with client device 210. In some implementations, client device 210 may output and/or store the results of the execution of the three versions of the first test method (e.g., test1) and/or the results of the execution of the three versions of the third test method (e.g., test3).

While FIG. 8 shows process 800 as including a particular quantity and arrangement of blocks, in some implementations, process 800 may include fewer blocks, additional blocks, or a different arrangement of blocks. Additionally, or alternatively, some of the blocks may be performed in parallel.

Example Combining and Reusing Parameters in an Automated Test Environment

FIGS. 9A-9D are diagrams of an example 900 of the process described above with respect to FIG. 8. In example 900, assume that client device 210/TCE 240 provides a user interface 910 for display to a user, as shown in FIG. 9A. User interface 910 may enable the user to input test methods. For example, the user may input the following test methods:

```
methods (Test,ParameterCombination='sequential')
    function test1(testCase, Param1)
    end
    function test2(testCase, Param1, Param2)
    end
end,
``` where test1 may correspond to the first test method, test2 may correspond to the second test method, and Param1 and Param2 may correspond to input arguments of the test methods. In some implementations, Param1 and Param2 may also correspond to test parameters associated with parameter properties. Thus, the input arguments of the test methods may match the test parameters.

In example 900, assume further that the user utilizes client device 210/TCE 240 to input parameter properties, as shown in a user interface 920 of FIG. 9B. For example, the user may input the following parameter properties:

```
properties (TestParameter)
    Param1=(A, B, C)
    Param2=(D, E, F)
end,
``` where properties may correspond to the parameter properties, TestParameter may correspond to properties being used as test parameters, Param1 may correspond to a first test parameter name, Param2 may correspond to a second test parameter name, and A, B, C, D, E, and F may correspond to parameter values.

In example 900, client device 210 may apply the parameter values (e.g., A, B, and C) of the first test parameter name (e.g., Param1) to the first test method (e.g., test1) to create multiple versions of the first test method. For example, as indicated by reference number 930 in FIG. 9C, the first test method (e.g., test1) may include a first version for the first parameter value (e.g., A), a second version for the second parameter value (e.g., B), and a third version for the third parameter value (e.g., C).

In example 900, client device 210 may apply the parameter values (e.g., A, B, and C) of the first test parameter name (e.g., Param1) and the parameter values (e.g., D, E, and F) of the second test parameter name (e.g., Param2) to the second test method (e.g., test2) to create multiple versions of the second test method. For example, as indicated by reference number 940 in FIG. 9C, the second test method (e.g., test2) may include a first version for the parameter values (e.g., A and D), a second version for the parameter values (e.g., B and E), and a third version for the parameter values (e.g., C and F).

In example 900, further assume that client device 210 executes the multiple versions of the first test method (e.g., test1) and executes the multiple versions of the second test method (e.g., test2), as indicated by reference number 950 in FIG. 9D. Execution of the multiple versions of the first test method (e.g., test1) and the second test method (e.g., test2) may generate results. For example, execution of the first version of the first test method (e.g., test1) may generate a result (e.g., $RESULT_A$), execution of the second version of the first test method (e.g., test1) may generate a result (e.g., $RESULT_B$), execution of the third version of the first test method (e.g., test1) may generate a result (e.g., $RESULT_C$), execution of the first version of the second test method (e.g., test2) may generate a result (e.g., $RESULT_{AD}$), execution of the second version of the second test method (e.g., test2) may generate a result (e.g., $RESULT_{BE}$), and execution of the third version of the second test method (e.g., test2) may generate a result (e.g., $RESULT_{CF}$). Client device 210 may display the generated results in a user interface and/or may store the generated results in a memory.

As indicated above, FIGS. 9A-9D are provided merely as an example. Other examples are possible and may differ from what was described with regard to FIGS. 9A-9D.

Example Process for Selecting and Executing Portions of a Parameterized Test

FIG. 10 is a flow chart of an example process 1000 for selecting and executing portions of a parameterized test in an automated test environment. In some implementations, process 1000 may be performed by client device 210 (e.g., TCE 240). In some implementations, process 1000 may be performed by another device or a group of devices (e.g., server device 220) separate from or including client device 210.

As shown in FIG. 10, process 1000 may include receiving test methods that include input arguments that match parameters associated with properties (block 1010). For example, a user of client device 210 may provide test methods to an environment (e.g., TCE 240) of client device 210. The test methods may be used to test one or more portions of code generated via TCE 240. In some implementations, the test methods may include syntax of a general form:

methods (Test,ParameterCombination='sequential')
        function test1 (testCase,Param1)
        end
        function test2(testCase)
        end
        function test3(testCase, Param1, Param2)
        end
    end, where test1 may correspond to a first test method, test2 may correspond to a second test method, test3 may correspond to a third test method, and Param1 and Param2 may correspond to input arguments of the test methods. Client device 210/TCE 240 may receive the test methods, and may store the test methods in a memory (e.g., main memory 330, ROM 340, and/or storage device 350 of FIG. 3) associated with client device 210. In some implementations, client device 210/TCE 240 may retrieve the test methods from the memory. In some implementations, the test methods may be associated with a test class.

As further shown in FIG. 10, process 1000 may include receiving values associated with the parameters (block 1020). For example, the user may provide parameter properties to client device 210/TCE 240. The parameter properties may include syntax of a general form:

properties (TestParameter)
        Param1=(A, B, C)
        Param2=(X, Y, Z)
    end, where properties may correspond to the parameter properties, TestParameter may correspond to properties being used as test parameters, Param1 may correspond to a first test parameter name, Param2 may correspond to a second test parameter name, and A, B, C, X, Y, and Z may correspond to parameter values. Client device 210/TCE 240 may receive the parameter properties, and may store the parameter properties in the memory associated with client device 210. In some implementations, client device 210/TCE 240 may retrieve the parameter properties from the memory.

Returning to FIG. 10, process 1000 may include combining the test methods together in a test suite (block 1030). For example, the user may provide a test suite command to client device 210/TCE 240. The test suite command may include syntax of a general form:

suite=TestSuite.fromClass(Test), where suite may correspond to the test suite, and TestSuite.fromClass(Test) may correspond to a test suite command that creates the test suite from the test methods provided in the test class. Client device 210/TCE 240 may receive the test suite command, and may create, based on the command, a test suite that includes a combination of the test methods.

As further shown in FIG. 10, process 1000 may include receiving identification of a particular parameter (block 1040). For example, client device 210/TCE 240 may receive identification of a particular parameter from the user associated with client device 210, from an external device, etc. In some implementations, the user may input the identification of the particular parameter to client device 210 via TCE 240, via an external memory device (e.g., a CD ROM, a flash drive, etc.), etc. For example, the user may identify the second test parameter (e.g., Param2) as the particular parameter. In some implementations, the identification may include syntax of a general form:

subsuite=suite.selectIf('ParameterName',    IsEqualTo ('Param2')), where subsuite may correspond to a portion of the test suite, suite.selectIf may correspond to a command that identifies elements of the test suite when the parameter name is equal to the particular parameter (e.g., Param2).

Returning to FIG. 10, process 1000 may include identifying elements of the test suite that include the particular parameter (block 1050). For example, client device 210 may identify elements or a portion of the test suite (e.g., suite) that include the particular parameter (e.g., Param1). In some implementations, the portion of the test suite may include the third test method (e.g., test3) of the test suite since the third test method is associated with the particular parameter.

As further shown in FIG. 10, process 1000 may include generating a portion of the test suite that includes the identified elements (block 1060). For example, client device 210 may generate a portion (e.g., subsuite) of the test suite that includes the third test method (e.g., test3). In some implementations, client device 210 may display the portion of the test suite to the user.

Returning to FIG. 10, process 1000 may include executing the portion of the test suite to generate results (block 1070). For example, client device 210 may execute some of the test methods of the test suite in order generate results. In some implementations, client device 210 may execute the third test method (e.g., test3) to generate results based on a first set of parameter values (e.g., A and X), a second set of parameter values (e.g. B and Y), and a third set of parameter values (e.g. C and Z).

As further shown in FIG. 10, process 1000 may include outputting and/or storing the results (block 1080). For example, client device 210 may output (e.g., display) the results of the execution of the portion of the test suite, and/or may store the results in a memory (e.g., main memory 330, ROM 340, and/or storage device 350 of FIG. 3) associated with client device 210. In some implementations, client device 210 may output and/or store the results of the execution of the third test method (e.g., test3).

In some implementations, parameterized testing may involve executing the same set of test methods multiple times with varying test parameters. The arrangement described herein may enable a user to execute a particular portion of a parameterized test. For example, the user may execute the parameterized test based on a particular parameter and/or a particular parameter value. Execution of an entire parameterized test may take several minutes. Whereas, execution of only a portion of the parameterized test may decrease execution time and may aid in debugging code.

While FIG. 10 shows process 1000 as including a particular quantity and arrangement of blocks, in some implementations, process 1000 may include fewer blocks, additional blocks, or a different arrangement of blocks. Additionally, or alternatively, some of the blocks may be performed in parallel.

Example Selection and Execution of Portions of a Parameterized Test

Figure 11B:
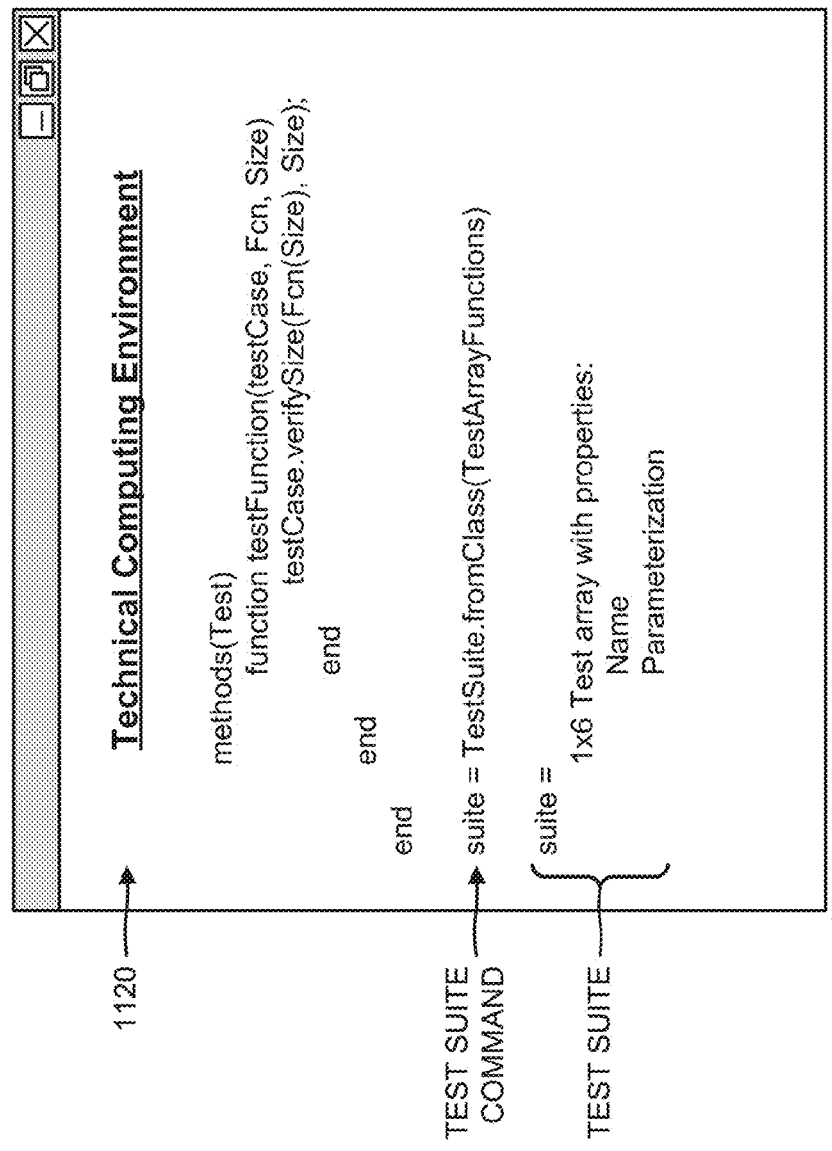
Figure 11C:
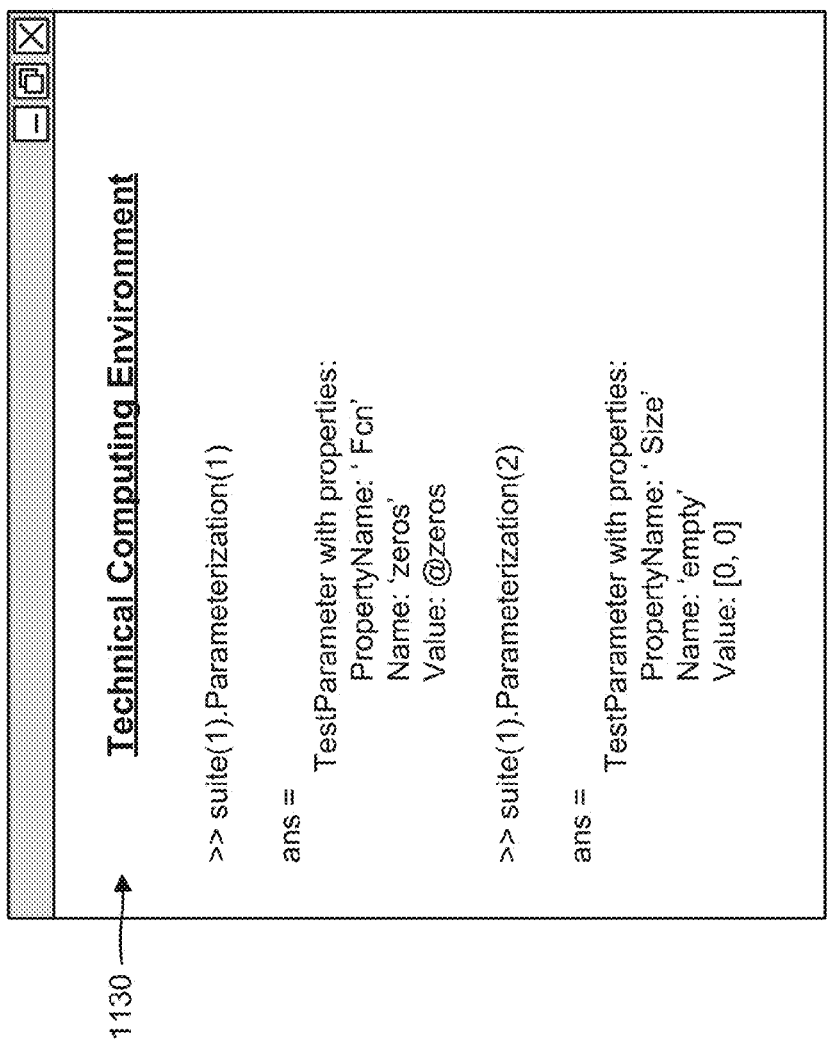

FIGS. 11A-11E are diagrams of an example 1100 of the process described above with respect to FIG. 10. In example 1100 and as shown in FIG. 11A, assume that client device 210 executes a computing environment (e.g., TCE 240) that generates a user interface 1110 for inputting parameter properties and/or test methods. Client device 210/TCE 240 may display user interface 1110 so that a user may input the parameter properties and/or the test methods. In example 1100 and as shown in FIG. 11A, assume that the user inputs the following parameter properties:
  properties(TestParameter)
    Fcn=struct('zeros', @zeros, . . .
      'ones', @ones, . . .
      'eye', @eye);
    Size=('empty', [0, 0], . . .
      'scalar' [1, 1]);
  end,
where properties may correspond to the parameter properties, TestParameter may correspond to properties being used as test parameters, Fcn may correspond to a first property name, Size may correspond to a second property name, zeros, ones, and eye may correspond to names for underlying values, and empty and scalar may correspond to names for underlying values.

As further shown in FIG. 11A, assume that the user inputs the following test methods:
  methods(Test)
    function testFunction(testCase, Fcn, Size)
      testCase.verifySize(Fcn(Size), Size)
    end
  end,
where testFunction may correspond to the test method, testCase may correspond to the test case instance, Fcn may correspond to a first input argument of the test method, and Size may correspond to a second input argument of the test method.

As shown in a user interface 1120 of FIG. 11B, assume that the user inputs the following test suite command:
  suite=TestSuite.fromClass(TestArrayFunctions),
where suite may correspond to the test suite, and TestSuite.fromClass(Test) may correspond to a test suite command that creates the test suite from the test methods. Client device 210/TCE 240 may receive the test suite command, and may create, based on the command, a test suite that includes a combination of the test methods. As further shown in user interface 1120, the test suite may include a one by six test array with six elements, a property name, and parameterization information (e.g., parameters, parameter values, etc.).

The user may inspect the test suite to determine whether each element contains information associated with the parameters used by the particular element. For example, as shown in a user interface 1130 of FIG. 11C, the user may inspect a first element and a first parameter (e.g., Fcn) of the test suite with the syntax suite(1).Parameterization(1). The syntax may return the following test parameter information:
  TestParameter with properties:
    PropertyName: 'Fcn'
    Name: 'zeros'
    Value: @zeros.
As further shown in user interface 1130, the user may inspect a first element and a second parameter (e.g., Size) of the test suite with the syntax suite(1).Parameterization(2). The syntax may return the following test parameter information:
  TestParameter with properties:
    PropertyName: ' Size'
    Name: 'empty'
    Value: [0, 0].
In example 1100 and as shown in FIG. 11D, assume that client device 210 executes a computing environment (e.g., TCE 240) that generates a user interface 1140 for inputting identification of a particular parameter or a particular parameter value. In example 1100 and as shown in FIG. 11D, assume that the user inputs the following identification:
  subsuite=suite.selectIf('ParameterValue', IsEqualTo ('ones')),
where subsuite may correspond to a portion of the test suite, suite.selectIf may correspond to a command that identifies elements of the test suite when the parameter value is equal to the particular parameter value (e.g., ones). As further shown in user interface 1140, the portion (e.g., subsuite) of the test suite may include a one by two test array with two suite elements, a property name, and parameterization information (e.g., parameters, parameter values, etc.).

In example 1100, the subsuite may include two suite elements that use the particular parameter value (e.g., ones). As shown in user interface 1140, the two suite elements may include the following information:

'TestArrayFunctions/testFunction(Fcn=ones,
   Size=empty)'
'TestArrayFunctions/testFunction(Fcn=ones,
   Size=scalar)'.
where the first suite element may include a first parameter (e.g., Fcn) value name of ones and a second parameter (e.g., Size) value name of empty; and the second suite element may include a first parameter (e.g., Fcn) value name of ones and a second parameter (e.g., Size) value name of scalar.

In example 1100, further assume that client device 210 executes the two suite elements, as indicated by reference number 1150 in FIG. 11E. Execution of the two suite elements may generate results. For example, execution of the first suite element may generate a result (e.g., $RESULT_{empty}$), and execution of the second suite element may generate a result (e.g., $RESULT_{scalar}$). Client device 210 may display the generated results in a user interface and/or may store the generated results in a memory.

As indicated above, FIGS. 11A-11E are provided merely as an example. Other examples are possible and may differ from what was described with regard to FIGS. 11A-11E.

Example Process for Utilizing Parameterized Test Fixtures in an Automated Test Environment FIG. 12 is a flow chart of an example process 1200 for utilizing parameterized test fixtures in an automated test environment. In some implementations, process 1200 may be performed by client device 210 (e.g., TCE 240). In some implementations, process 1200 may be performed by another device or a group of devices (e.g., server device 220) separate from or including client device 210.

As shown in FIG. 12, process 1200 may include receiving test methods that include input arguments associated with parameters of test fixtures (block 1210). For example, a user of client device 210 may provide test methods to an environment (e.g., TCE 240) of client device 210. The test methods may be used to test one or more portions of code generated via TCE 240. In some implementations, the test method may include syntax of a general form:
   function shared(testCase, Param1),
where shared is the TestClassSetup method which, according to the value of Param1, may set up the environmental state needed for the test methods (e.g., test1 and test2), and Param1 may correspond to an input argument of the TestClassSetup method. Client device 210/TCE 240 may receive the test methods, and may store the test methods in a memory (e.g., main memory 330, ROM 340, and/or storage device 350 of FIG. 3) associated with client device 210. In some implementations, client device 210/TCE 240 may retrieve the test methods from the memory.

As further shown in FIG. 12, process 1200 may include receiving environments associated with the parameters (block 1220). For example, the user may provide test fixture properties to client device 210/TCE 240. The test fixture properties may include syntax of a general form:
   properties (ClassSetupParameter)
      Param=(x1, x2);
   end,
where properties may correspond to the test fixture properties, ClassSetupParameter may correspond to properties being used as test fixture parameters, Param may correspond to a test parameter name, and x1 and x2 may correspond to parameter values that may be used to set up different environmental states. Client device 210/TCE 240 may receive the test fixture properties, and may store the test fixture properties in the memory associated with client device 210. In some implementations, client device 210/TCE 240 may retrieve the test fixture properties from the memory.

In some implementations, the user may want to execute a test method multiple times while changing a state of an environment prior to executing the test method. For example, the user may wish to change a default compiler used for compiling the code. The user may want to execute test methods that generate and compile the code using different default compilers. The parameterized test fixture may be used to set up different default compilers.

In some implementations, parameterized fixtures may be valuable when there is more than one test method and environmental setup is expensive. The TestClassSetup method may set up a particular environment which may be used by a number of test methods. The TestClassSetup method may be invoked a second time, with a different parameter value, in order to configure the environment another way. The test methods may then be executed again in this new environment. The expensive environment may be setup a minimal number of times (once per shared parameterization), which may reduce the expense.

As further shown in FIG. 12, process 1200 may include applying the test fixture parameters and/or the environments to the test methods (block 1230). For example, client device 210 may apply the parameter environments (e.g., x1 and x2) to the test method (e.g., test) to create multiple versions of the test method. In some implementations, the test method may inherit the environmental state of the environment (e.g., x1) and the environmental state of the environment (e.g., x2).

Returning to FIG. 12, process 1200 may include executing the test methods with the applied parameters and/or environments to generate results (block 1240). For example, client device 210 may execute the test methods with the applied parameter environments in order generate results. In some implementations, client device 210 may execute the two versions of the test method (e.g., test) to generate results based on the environment (e.g., x1) and the environment (e.g., x2).

As further shown in FIG. 12, process 1200 may include outputting and/or storing the results (block 1250). For example, client device 210 may output (e.g., display) the results of the execution of the test methods, and/or may store the results in a memory (e.g., main memory 330, ROM 340, and/or storage device 350 of FIG. 3) associated with client device 210. In some implementations, client device 210 may output and/or store the results of the execution of the two versions of the test method (e.g., test).

While FIG. 12 shows process 1200 as including a particular quantity and arrangement of blocks, in some implementations, process 1200 may include fewer blocks, additional blocks, or a different arrangement of blocks. Additionally, or alternatively, some of the blocks may be performed in parallel.

Example Utilizing Parameterized Test Fixtures in an Automated Test Environment

Figure 13A:
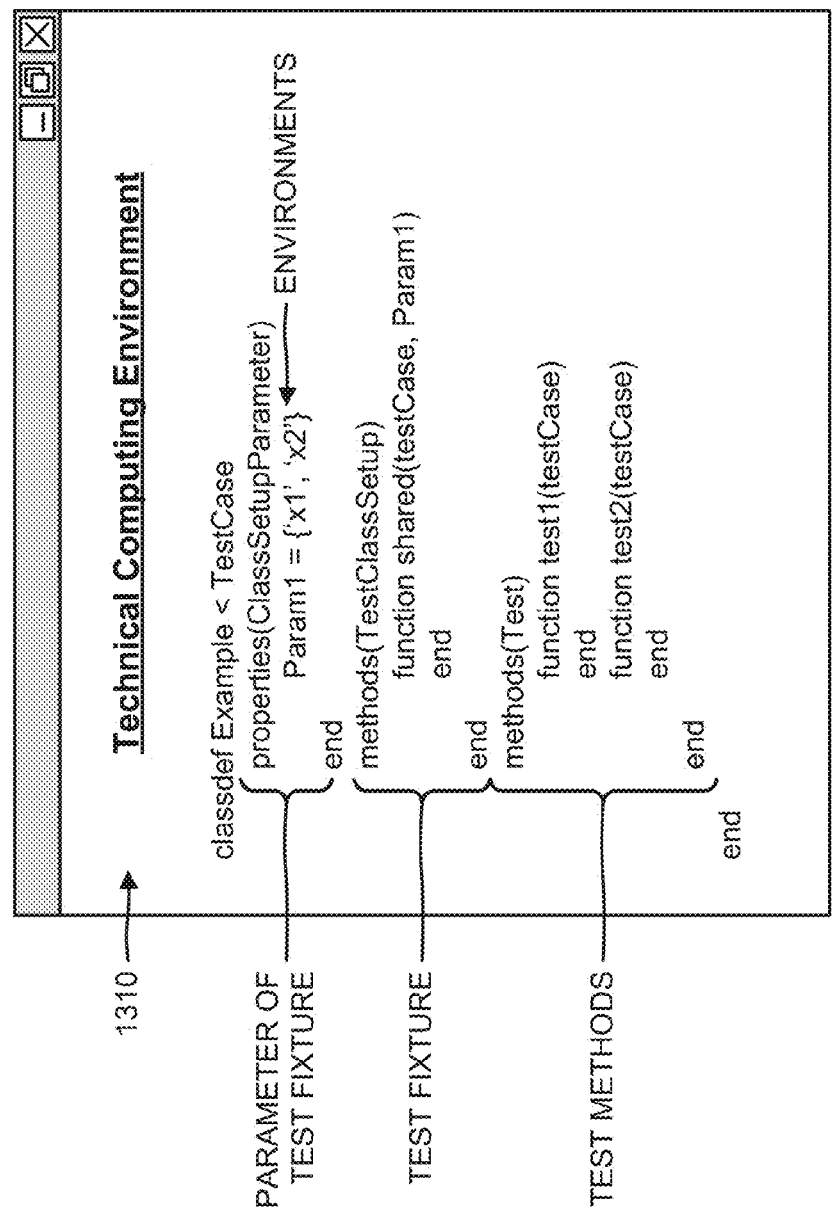
FIGS. 13A-13C are diagrams of an example of the process described in connection with FIG. 12.
Figure 13B:
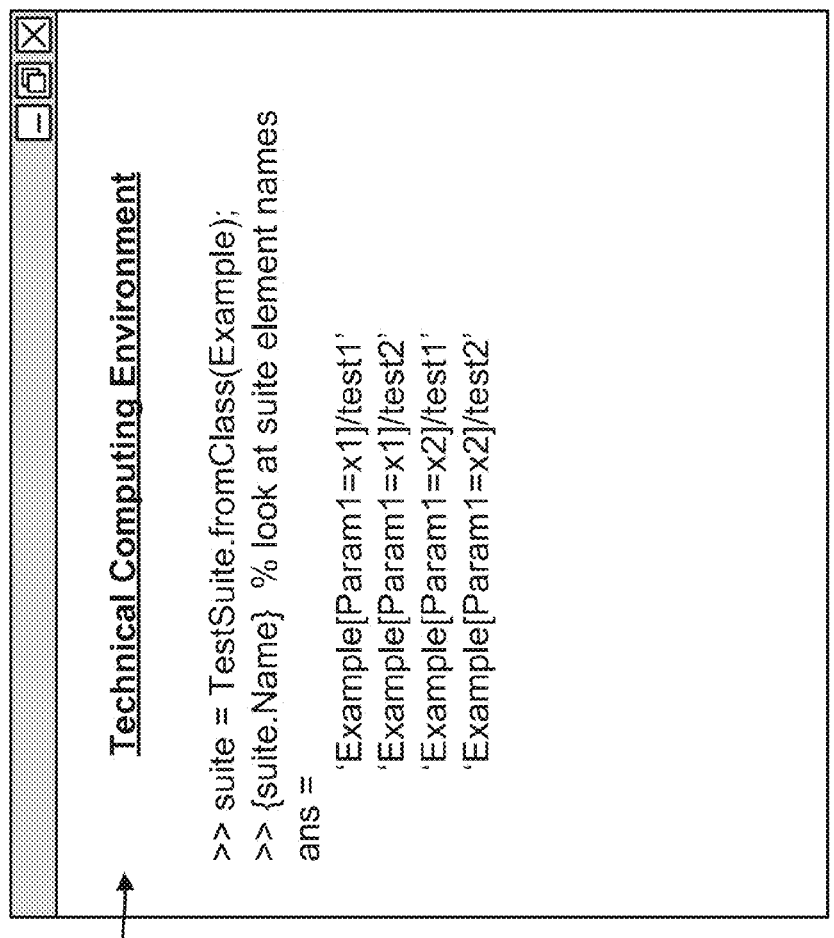
Figure 13C:
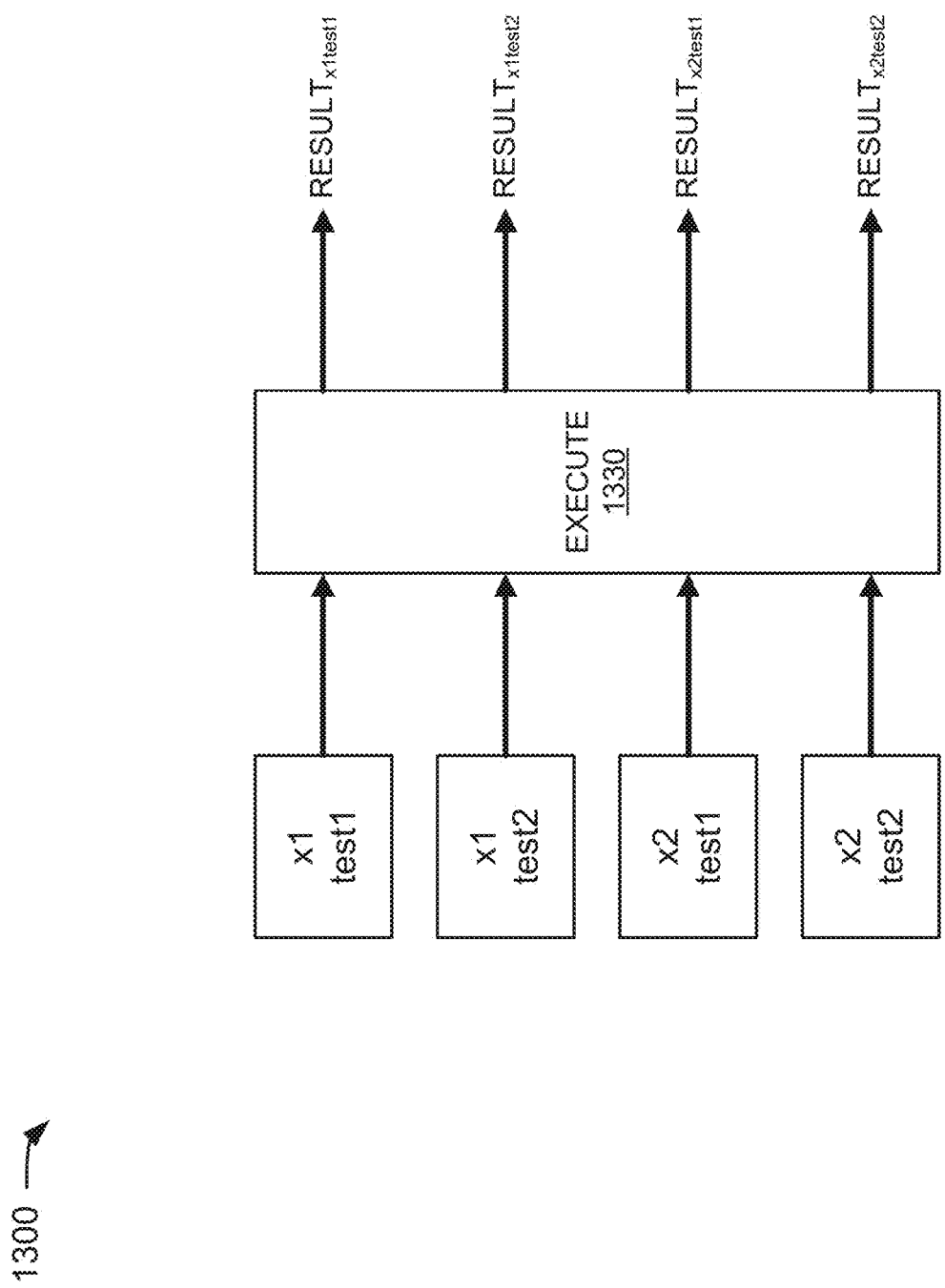

FIGS. 13A-13C are diagrams of an example 1300 of the process described above with respect to FIG. 12. In example 1300, assume that client device 210/TCE 240 provides a user interface 1310 for display to a user, as shown in FIG. 13A. User interface 1310 may enable the user to input a parameter of a test fixture. For example, the user may input the following test fixture parameter:
   properties (ClassSetupParameter)
       Param1=('x1', 'x2')
   end,
where properties may correspond to the test fixture properties, ClassSetupParameter may correspond to properties being used as test fixture parameters, Param1 may correspond to a test parameter name, and x1 and x2 may correspond to parameter values that may be used to set up different environmental states.

In example 1300, assume further that the user utilizes client device 210/TCE 240 to input a test fixture, as further shown in user interface 1310. For example, the user may input the following test fixture:
   methods(TestClassSetup)
       function shared(testCase, Param1)
       end
   end,
where shared is the TestClassSetup method which, according to the value of Param1, may set up the environmental state needed for the test methods (e.g., test1 and test2), and Param1 may correspond to an input argument of the TestClassSetup method.

In example 1300, assume further that the user utilizes client device 210/TCE 240 to input test methods, as further shown in user interface 1310. For example, the user may input the following test methods:
   methods (Test)
       function test1 (testCase)
       end
       function test2(testCase)
       end
   end,
where testCase may correspond to code that is to be tested by the test methods, test1 may correspond to the first test method, and test2 may correspond to the second test method.

As shown in a user interface 1320 of FIG. 13B, the information provided by the user in user interface 1310 may create a test suite that includes four elements. For example, the test suite may include the following suite element names:
   Example[Param1=x1]/test1
   Example[Param1=x1]/test2
   Example[Param1=x2]/test1
   Example[Param1=x2]/test2.
The suite elements that utilize the parameter environment x1 may be grouped together, and the suite elements that utilize the parameter environment x2 may be grouped together. In some implementations, the suite elements may be grouped in this way for efficiency. However, the suite elements may be reordered arbitrarily and may still execute correctly because each suite element in the test suite array may include all the necessary information about how to set up the test fixtures.

In example 1300, client device 210 may apply the parameter environments (e.g., x1 and x2) of the test fixture parameter name (e.g., Param1) to the first test method (e.g., test1) to create multiple versions of the first test method. For example, as shown in FIG. 13C, the first test method (e.g., test1) may include a first version for the first parameter environment (e.g., x1), and a second version for the second parameter environment (e.g., x2).

In example 1300, client device 210 may apply the parameter environments (e.g., x1 and x1) of the test fixture parameter name (e.g., Param1) to the second test method (e.g., test2) to create multiple versions of the second test method. For example, as shown in FIG. 13C, the second test method (e.g., test2) may include a first version for the first parameter environment (e.g., x1), and a second version for the second parameter environment (e.g., x2).

In example 1300, further assume that client device 210 executes the multiple versions of the first test method (e.g., test1) and executes the multiple versions of the second test method (e.g., test2), as indicated by reference number 1330 in FIG. 13C. Execution of the multiple versions of the first test method (e.g., test1) and the second test method (e.g., test2) may generate results. For example, execution of the first version of the first test method (e.g., test1) may generate a result (e.g., $RESULT_{x1test1}$), execution of the second version of the first test method (e.g., test1) may generate a result (e.g., $RESULT_{x2test1}$), execution of the first version of the second test method (e.g., test2) may generate a result (e.g., $RESULT_{x1test2}$), execution of the second version of the second test method (e.g., test2) may generate a result (e.g., $RESULT_{x2test2}$). Client device 210 may display the generated results in a user interface and/or may store the generated results in a memory.

As indicated above, FIGS. 13A-13C are provided merely as an example. Other examples are possible and may differ from what was described with regard to FIGS. 13A-13C.

Conclusion

Systems and/or methods described herein may provide a mechanism to define parameter values and to specify which test methods use the parameters. Each parameter may be defined separately and each test method may independently use any number of parameters defined in a test. The systems and/or methods may enable a particular portion of a parameterized test to be executed, such as a portion of the test that utilizes a particular parameter and/or parameter value. The systems and/or methods may enable shared test fixtures (e.g., mechanisms to set up environmental conditions to execute a test) to be parameterized so that a test may be executed multiple times in different environments.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving information regarding test methods that include input arguments that match one or more parameters,
the test methods being used to test one or more portions of dynamically-type programming code,
the one or more parameters defining one or more conditions for the test methods, and
the receiving the information regarding the test methods being performed by a device;
combining the test methods together in a test suite;
receiving one or more values for each of the one or more parameters,
the receiving the one or more values being performed by the device;
applying the one or more parameters and the one or more values to different ones of the test methods,
at least one of the one or more parameters being reused by the different ones of the test methods or at least two of the one or more parameters being combined by the different ones of the test methods,
the applying the one or more parameters and the one or more values being performed by the device;
identifying at least one of the test methods that includes a particular parameter, of the one or more parameters, or a particular value of the one or more values,
the identifying the at least one of the test methods including:
receiving identification of the particular parameter of the parameters or the particular value of the one or more values;
identifying one or more elements in the test suite that include the particular parameter or the particular value,
the one or more elements including the at least one of the test methods;
the identifying the at least one of the test methods being performed by the device;
generating a portion of the test suite that includes the one or more elements,
the generating the portion of the test suite being performed by the device;
executing the portion of the test suite to generate results,
the executing the portion of the test suite being performed by the device; and
outputting or storing the results,
the outputting or storing being performed by the device.

2. The method of claim 1, further comprising:
providing one or more of the results for display.

3. The method of claim 1, where the different ones of the test methods include a subset of the test methods.

4. The method of claim 1, where the one or more parameters are associated with a test fixture that establishes one or more environments for executing the test methods, and the method further comprises:

receiving the one or more environments for each of the one or more parameters; and
applying the one or more parameters and the one or more environments to the test methods.

5. The method of claim 4, further comprising:
executing the test methods, with the one or more parameters that are applied and the one or more environments that are applied, to generate other results; and
outputting or storing the other results.

6. A non-transitory computer-readable medium for storing instructions, the instructions comprising:
one or more instructions that, when executed by a processor of a device, cause the processor to:
receive information regarding test methods that include input arguments, the input arguments being associated with one or more parameters,
the test methods being used to test one or more portions of dynamically-typed programming code, and
the one or more parameters defining one or more conditions for the test methods,
combine the test methods together in a test suite,
receive one or more values for the one or more parameters,
apply the one or more parameters and the one or more values to different ones of the test methods,
at least one of the one or more parameters being reused by the different ones of the test methods, or
at least two of the one or more parameters being combined by the different ones of the test methods,
identify at least one of the test methods that includes a particular parameter, of the one or more parameters, or a particular value of the one or more values,
the one or more instructions that, when executed by the processor to identify the at least one of the test methods, cause the processor to:
receive identification of:
the particular parameter of the one or more parameters, or
the particular value of the one or more values,
identify one or more elements in the test suite that include the particular parameter or the particular value,
the one or more elements including the at least one of the test methods,
generate a portion of the test suite that includes the one or more elements, execute the portion of the test suite to generate results, and output or store the results.

7. The non-transitory computer-readable medium of claim 6, where the different ones of the test methods include a subset of the test methods.

8. The non-transitory computer-readable medium of claim 6, where the one or more parameters are associated with a test fixture that establishes one or more environments for executing the test methods, and the instructions further comprise:
one or more instructions that, when executed by the processor, cause the processor to:
receive the one or more environments for each of the one or more parameters, and
apply the one or more parameters and the one or more environments to the test methods.

9. The non-transitory computer-readable medium of claim 8, where the instructions further comprise:
one or more instructions that, when executed by the processor, cause the processor to:

execute the test methods, with the one or more parameters that are applied and the one or more environments that are applied, to generate other results, and output or store the other results.

10. The non-transitory computer-readable medium of claim 8, where the one or more environments include a compiler.

11. A device comprising:
one or more processors to:
receive information regarding test methods that include input arguments, the input arguments being associated with one or more parameters,
the test methods being used to test one or more portions of dynamically-typed programming code, and
the one or more parameters defining one or more conditions for the test methods,
the one or more parameters being associated with a test fixture that establishes one or more environments for executing the test methods,
receive one or more values for each of the one or more parameters,
apply the one or more parameters and the one or more values to different ones of the test methods,
at least one of the one or more parameters being reused by the different ones of the test methods, or
at least two of the one or more parameters being combined by the different ones of the test methods,
identify at least one of the test methods that includes a particular parameter, of the one or more parameters, or a particular value of the one or more values,
execute the at least one of the test methods that is identified,
receive the one or more environments for each of the one or more parameters, and
apply the one or more parameters and the one or more environments to the test methods.

12. The device of claim 11, where the one or more processors are further to:
execute the test methods, with the one or more parameters that are applied and the one or more environments that are applied, to generate results, and
output or store the results.

13. The device of claim 11, where the one or more processors are further to:
combine the test methods together in a test suite, and
output or store the test suite.

14. The device of claim 13, where the one or more processors, when identifying the at least one of the test methods, are to:
receive identification of:
the particular parameter of the one or more parameters, or
the particular value of the one or more values,
identify one or more elements in the test suite that include the particular parameter or the particular value,
the one or more elements including the at least one of the test methods,
where the one or more processors are further to:
generate a portion of the test suite that includes the one or more elements,
execute the portion of the test suite to generate results, and
output or store the second results.

15. The device of claim 11, where the one or more environments include a compiler.

16. The device of claim 11, where the different ones of the test methods include a subset of the test methods.

* * * * *

UNITED STATES PATENT AND TRADEMARK OFFICE
CERTIFICATE OF CORRECTION

PATENT NO. : 9,612,940 B1
APPLICATION NO. : 13/907020
DATED : April 4, 2017
INVENTOR(S) : David Hruska et al.

It is certified that error appears in the above-identified patent and that said Letters Patent is hereby corrected as shown below:

In the Claims

Column 25, Line 15, Claim 1 change "input arguments that match one or more parameters" to --input arguments, the input arguments being associated with one or more parameters--

Column 25, Line 17, Claim 1 change "dynamically-type programming code" to --dynamically-typed programming code--

Column 25, Line 23, Claim 1 change "values for each of the one or more parameters" to --values for each of at least one of the one or more parameters--

Column 27, Line 21, Claim 11 change "values for each of the one or more " to --values for each of at least one of the one or more--

Column 28, Line 29, Claim 14 change "store the second results" to --store the results--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*